(12) United States Patent
Egan

(10) Patent No.: US 12,703,290 B2
(45) Date of Patent: Aug. 11, 2026

(54) LIFTING AND TRANSPORTING APPARATUS AND METHOD

(71) Applicant: Thomas F. Egan, Binghamton, NY (US)

(72) Inventor: Thomas F. Egan, Binghamton, NY (US)

( * ) Notice: Subject to any disclaimer, the term of this patent is extended or adjusted under 35 U.S.C. 154(b) by 0 days.

(21) Appl. No.: 17/803,767

(22) Filed: Nov. 17, 2022

(65) Prior Publication Data

US 2024/0166115 A1 May 23, 2024

Related U.S. Application Data

(60) Provisional application No. 63/361,015, filed on Nov. 17, 2021.

(51) Int. Cl.

| | |
|---|---|
| ***B60P 1/54*** | (2006.01) |
| ***B60P 1/44*** | (2006.01) |
| ***B66F 9/075*** | (2006.01) |
| *B60S 9/02* | (2006.01) |
| *B66C 23/78* | (2006.01) |
| *E02F 9/08* | (2006.01) |

(52) U.S. Cl.
CPC ............. *B60P 1/548* (2013.01); *B60P 1/4485* (2013.01); *B66F 9/07559* (2013.01); *B60S 9/02* (2013.01); *B66C 23/78* (2013.01); *E02F 9/085* (2013.01)

(58) Field of Classification Search
CPC .......... B60P 1/4485; B60P 1/548; B60S 9/02; B66C 23/78; B66F 9/07559; E02F 9/085
USPC .......................................................... 414/462
See application file for complete search history.

(56) References Cited

U.S. PATENT DOCUMENTS

| | | | |
|---|---|---|---|
| 360,578 | A | 4/1887 | Francis |
| 1,465,168 | A | 8/1923 | Morris |
| 2,636,744 | A | 4/1953 | Trees |
| 2,792,951 | A | 5/1957 | White |
| 2,864,431 | A | 12/1958 | Eaton |

(Continued)

FOREIGN PATENT DOCUMENTS

| | | |
|---|---|---|
| DE | 3123546 | 1/1983 |
| GB | 2322352 | 8/1998 |

(Continued)

OTHER PUBLICATIONS

Bruno Independent Living Aids, Inc., Operator/Installation Manual; 2001.

*Primary Examiner* — James Keenan

(57) ABSTRACT

A lifting and transporting apparatus and method are described. In one particular embodiment, the apparatus and method may be realized as an apparatus for lifting and transporting objects comprising a vertical support beam, the vertical support beam comprising at least one first attachment mechanism for removably attaching a maneuverable assembly for accepting mountable objects, the vertical support beam comprising at least one second attachment mechanism for removably rotatably attaching a lifting apparatus for lifting objects. The apparatus further comprising a plurality of outriggers pivotably attached to a lower end of the vertical support beam, each outrigger comprising an arm extending away from the vertical support beam in a substantially horizontal position in a deployed state and pivoting to a substantially vertical position in a stowed state.

12 Claims, 31 Drawing Sheets

(56) References Cited

U.S. PATENT DOCUMENTS 3,147,994 A 9/1964 Lapine
3,164,911 A * 1/1965 Vaughen .................. G09B 9/46 434/33
3,175,696 A 3/1965 Milbourne
3,222,029 A 12/1965 Hildemann
3,516,559 A 6/1970 Walter
3,659,594 A 5/1972 Schwab
3,677,424 A 7/1972 Anderson
3,710,962 A 1/1973 Fowler, Jr.
3,715,039 A 2/1973 Kollmann et al.
3,752,261 A * 8/1973 Bushnell, Jr. ............. E04G 1/22 182/115
3,794,381 A 2/1974 Caldemeyer
3,795,332 A * 3/1974 Eriksson ................. B60P 1/548 414/539
3,891,237 A 6/1975 Allen
3,896,946 A 7/1975 Forsyth et al.
4,015,725 A 4/1977 Ryan et al.
4,075,719 A 2/1978 Sullivan
4,096,955 A 6/1978 Dake
4,133,437 A 1/1979 Gates
4,140,230 A 2/1979 Pearson
4,142,641 A 3/1979 Dake
4,169,338 A 10/1979 Eik
4,170,368 A 10/1979 Southward
4,183,708 A 1/1980 Kuhbier
4,225,149 A 9/1980 Koopman
4,226,567 A 10/1980 Van Orsdale, Jr.
4,270,630 A 6/1981 Karkau
4,298,128 A 11/1981 Gattu
4,306,634 A 12/1981 Sangster
4,365,924 A 12/1982 Brigman et al.
4,394,912 A * 7/1983 Epps ....................... B66C 23/78 280/765.1
4,398,858 A 8/1983 Paffrath
4,406,574 A 9/1983 Riley
4,420,286 A 12/1983 Hanson et al.
4,438,640 A 3/1984 Willis
4,456,421 A 6/1984 Robson
4,457,663 A 7/1984 Hems
4,458,870 A 7/1984 Duncan et al.
4,463,965 A 8/1984 Lawson
4,479,753 A 10/1984 Thorley
4,483,653 A 11/1984 Waite
4,534,450 A 8/1985 Savaria
4,545,085 A 10/1985 Feldt
4,551,060 A 11/1985 Quercy
4,566,842 A 1/1986 Clarke
4,569,094 A 2/1986 Hart et al.
4,573,854 A 3/1986 McFarland
4,605,132 A 8/1986 Van Seumeren
4,616,972 A 10/1986 McFarland
4,644,595 A 2/1987 Daniel
4,659,276 A 4/1987 Billett
4,661,035 A 4/1987 Danielsson
4,664,584 A 5/1987 Braun et al.
4,671,729 A 6/1987 McFarland
4,685,860 A 8/1987 McFarland
4,775,282 A 10/1988 Van Vliet
4,786,072 A 11/1988 Girvin
4,793,626 A 12/1988 Gefroh
4,797,042 A 1/1989 McFarland
4,801,237 A 1/1989 Yamamoto
4,808,056 A 2/1989 Oshima
4,809,998 A 3/1989 Girvin
4,844,497 A 7/1989 Allen
4,893,963 A 1/1990 Le Goff
4,941,216 A 7/1990 Boublil
4,955,779 A 9/1990 Knackstedt
4,974,766 A 12/1990 DiPalma et al.
5,022,106 A 6/1991 Richards
5,035,467 A 7/1991 Axelson et al.
5,040,832 A 8/1991 Zalewski
5,077,844 A 1/1992 Twitchell
5,102,195 A 4/1992 Axelson et al.
5,110,173 A 5/1992 Megna
5,149,246 A 9/1992 Dorn
5,154,563 A 10/1992 Phillips
5,156,517 A 10/1992 Boissonneault
5,160,236 A 11/1992 Redding et al.
5,180,275 A 1/1993 Czech et al.
5,193,633 A 3/1993 Ezenwa
5,201,377 A 4/1993 Wilson
5,205,697 A 4/1993 Getty et al.
5,211,172 A 5/1993 McGuane
5,211,526 A * 5/1993 Robinette ............... B66C 23/48 414/718
5,261,779 A 11/1993 Goodrich
5,263,207 A 11/1993 Gilbert
5,308,214 A 5/1994 Crain et al.
5,333,333 A 8/1994 Mah
5,335,970 A 8/1994 Bryant
5,344,265 A 9/1994 Ullman
5,348,172 A 9/1994 Wilson
5,375,913 A 12/1994 Blanchard
5,396,670 A 3/1995 Firebaugh
5,427,289 A 6/1995 Ostor
5,431,240 A * 7/1995 Merritt .................. B66F 11/046 180/9.1
5,431,526 A 7/1995 Peterson et al.
5,456,335 A 10/1995 Kinsey
5,456,568 A 10/1995 Kirby et al.
5,459,891 A 10/1995 Reeve et al.
5,467,813 A 11/1995 Vermaat
5,502,851 A 4/1996 Costello
5,520,403 A 5/1996 Bergstrom et al.
5,540,539 A 7/1996 Wolfman et al.
5,542,811 A 8/1996 Vartanian
5,556,163 A 9/1996 Rogers
5,560,054 A 10/1996 Simon
5,617,963 A 4/1997 Baziuk et al.
5,628,595 A 5/1997 Harris
5,630,638 A 5/1997 Hirasawa et al.
5,639,105 A 6/1997 Summo
5,649,329 A 7/1997 Horcher et al.
5,682,630 A 11/1997 Simon
5,707,103 A 1/1998 Balk
5,746,563 A 5/1998 Steckler
5,827,036 A 10/1998 Steffes et al.
5,845,348 A 12/1998 Dunn et al.
5,857,832 A 1/1999 Al-Temen et al.
5,896,602 A 4/1999 Marblestone
5,934,409 A * 8/1999 Citron ................... B66F 11/044 182/17
5,987,664 A 11/1999 Somerton et al.
6,026,523 A 2/2000 Simon et al.
6,039,402 A 3/2000 Nemoto
6,042,330 A 3/2000 Egan
6,086,085 A 7/2000 Larsson
6,086,312 A 7/2000 Ziaylek et al.
6,223,364 B1 5/2001 Egan
6,260,218 B1 7/2001 Tsuga
6,283,528 B1 9/2001 Townsend
6,289,534 B1 9/2001 Hakamiun et al.
6,296,221 B1 10/2001 Nadeau
6,367,103 B1 4/2002 Collins
6,378,659 B1 4/2002 Krumbeck
6,386,614 B1 5/2002 Logan
6,390,554 B1 5/2002 Eakins et al.
6,416,272 B1 7/2002 Suehiro
6,461,097 B1 10/2002 Ablabutyan
6,526,677 B1 3/2003 Bloxdorf
6,595,398 B2 7/2003 Himel
6,595,738 B2 7/2003 Rock et al.
6,612,615 B1 9/2003 Dimand
6,612,802 B2 9/2003 Egan
6,651,280 B2 11/2003 Blevins
6,682,291 B2 1/2004 Schatzler et al.
6,692,215 B1 2/2004 Panzarella et al.
6,739,642 B1 5/2004 Egan
6,739,824 B2 5/2004 Dupuy et al.
6,806,430 B2 10/2004 Downing
6,820,911 B2 11/2004 Furui
6,823,541 B2 11/2004 Egan

(56) References Cited

U.S. PATENT DOCUMENTS 6,830,272 B1 * 12/2004 Bailey .................... B66C 23/48 414/812
6,928,766 B1 8/2005 Goebel
7,011,330 B2 3/2006 Blanton
7,100,718 B2 9/2006 Bancroft
7,108,466 B2 9/2006 Panzarella
7,182,385 B2 2/2007 Christopher
7,207,765 B1 4/2007 Egan
7,284,944 B1 10/2007 Schlangen
7,316,441 B2 1/2008 Iwatani et al.
7,340,801 B2 3/2008 Yamaguchi
7,347,658 B2 3/2008 Schlangen
7,374,186 B2 * 5/2008 Mason ................ B60B 33/0049 280/47.131
7,374,390 B2 5/2008 Strong
7,383,107 B2 6/2008 Fehr
7,402,019 B2 7/2008 Alexander
7,404,505 B2 7/2008 Walther
7,419,347 B1 * 9/2008 Cormier .................... B60R 9/06 224/524
7,543,876 B1 6/2009 Egan
7,544,032 B1 * 6/2009 Scott, Jr. ............... B60P 1/5471 280/847
7,621,365 B2 11/2009 Egan
7,651,313 B1 1/2010 Egan
7,717,005 B2 5/2010 Wang
7,717,663 B1 * 5/2010 Stowers .................. B60P 1/548 414/921
7,788,858 B1 * 9/2010 Ammons ................ B66C 23/44 212/292
7,850,242 B2 12/2010 Taguchi
7,862,287 B2 1/2011 Egan
8,091,945 B2 1/2012 Hancock
8,132,997 B2 3/2012 Reuille et al.
8,656,529 B2 2/2014 Corriveau
8,696,063 B2 4/2014 Rattenbury
9,217,535 B1 12/2015 Egan
10,920,444 B2 * 2/2021 Kensinger ........... E04B 1/34305
2002/0074305 A1 6/2002 Davis
2003/0108412 A1 6/2003 Zimmer
2004/0066074 A1 4/2004 Ovitt
2004/0232396 A1 11/2004 Ming-Hwa
2005/0264020 A1 12/2005 Egan
2006/0045686 A1 3/2006 Alexander
2006/0045704 A1 * 3/2006 Laufenberg ............. B60P 1/548 414/543
2006/0061178 A1 3/2006 Billger
2006/0087166 A1 4/2006 Trippensee et al.
2006/0182569 A1 8/2006 Andersson
2010/0040452 A1 2/2010 Egan
2010/0084535 A1 4/2010 Cvek
2011/0076121 A1 3/2011 Gaghis
2011/0225728 A1 9/2011 Thornhill
2011/0268545 A1 11/2011 Fakhrizadeh
2011/0302711 A1 12/2011 Biersteker
2012/0091772 A1 4/2012 Egan

FOREIGN PATENT DOCUMENTS

JP 11-253492 9/1999
JP 2001315565 11/2001
JP 2004195062 7/2004
SU 1484678 A 6/1989
WO WO-9010554 A1 * 9/1990 .............. B60P 1/548

* cited by examiner

LIFTING AND TRANSPORTING APPARATUS AND METHOD

CROSS-REFERENCE TO RELATED APPLICATIONS

This patent application claims priority to U.S. Provisional Patent Application No. 63/361,015, filed Nov. 17, 2021, which is hereby incorporated by reference herein in its entirety.

FIELD OF THE DISCLOSURE

The present disclosure relates generally to systems for lifting and transporting objects and, more particularly, to a lifting and transporting apparatus and method.

BACKGROUND OF THE DISCLOSURE

When lifting and transporting objects, it can often be difficult to initially lift the objects due to their weight. It can also be difficult to move the objects once lifted, also due to their weight and the distance the objects need to travel. These difficulties can often be exacerbated by the terrain upon or over which the objects must be lifted and transported. And when many objects require lifting and transporting, human efforts to accomplish the lifting and transporting tasks may be limited.

In view of the foregoing, it may be understood that there may be significant problems and shortcomings associated with current systems for lifting and transporting objects.

SUMMARY OF THE DISCLOSURE

A lifting and transporting apparatus and method are disclosed. In one particular embodiment, the apparatus and method may be realized as an apparatus for lifting and transporting objects comprising a vertical support beam, the vertical support beam comprising at least one first attachment means for removably rotatably attaching an object for accepting lifted objects, the vertical support beam comprising at least one second attachment means for removably rotatably attaching a lifting apparatus for lifting objects; and a plurality outriggers pivotably attached to a lower end of the vertical support beam, each outrigger comprising an arm extending away from the vertical support beam in a substantially horizontal position in a deployed state and pivoting to a substantially vertical position in a stowed state, each outrigger arm having a mounting means substantially at an end thereof for supporting the vertical support beam in a substantially vertical orientation while in the deployed state.

In accordance with other aspects of this particular embodiment, the mounting means comprises a caster assembly.

In accordance with other aspects of this particular embodiment, the mounting means comprises a pad assembly.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are, within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
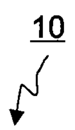
FIG. 1 shows an oblique rear view of a lifting and load transferring apparatus in accordance with an embodiment of the present disclosure with a fork adapter picking device option deployed, with a powered parallel-arm lift arm assembly option shown in a horizontal position, and an entire assembly pointing substantially rearward of an object to which the system is mounted.
Figure 1:
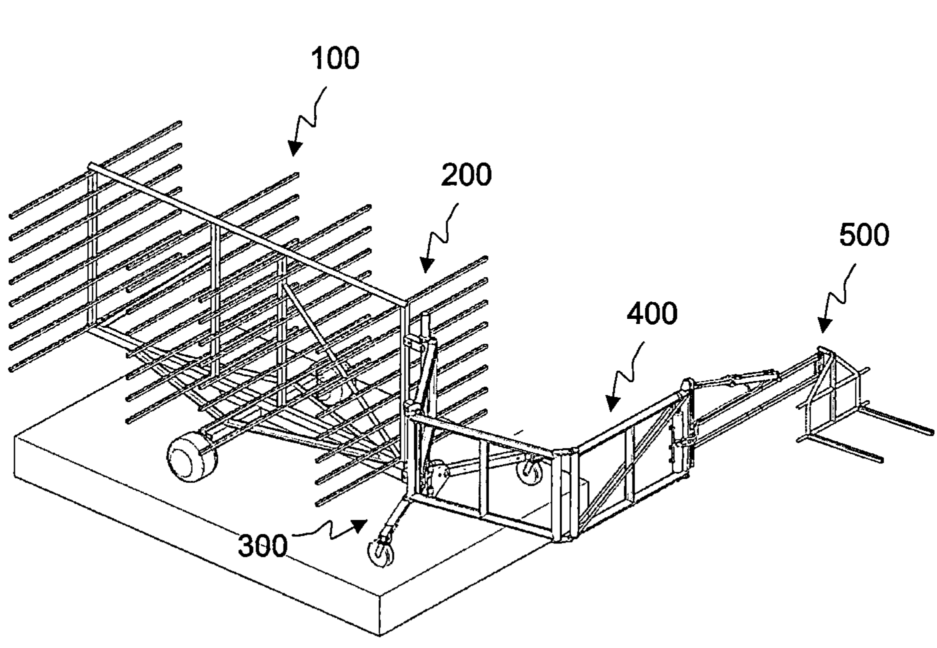
Figure 2:
FIG. 2 shows an oblique right rear view of a lifting and load transferring apparatus in accordance with an embodiment of the present disclosure with a platform adapter picking device option deployed, with a powered parallel-arm lift arm assembly option shown in a horizontal position, and a lift pointing substantially rearward of an object to which the system is mounted.
Figure 2:
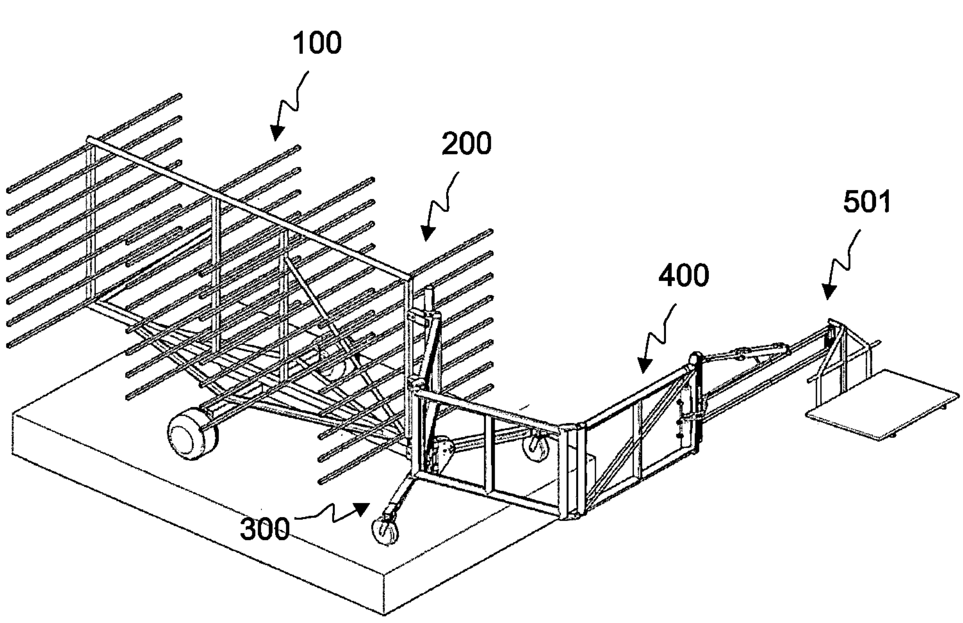
Figure 3:
FIG. 3 shows an oblique right rear view of a lifting and load transferring apparatus in accordance with an embodiment of the present disclosure inducing a seat option deployed, with a powered parallel-arm lift arm assembly option shown in a horizontal position, with an entire assembly pointing substantially rearward of an object to which the system is mounted.
Figure 3:
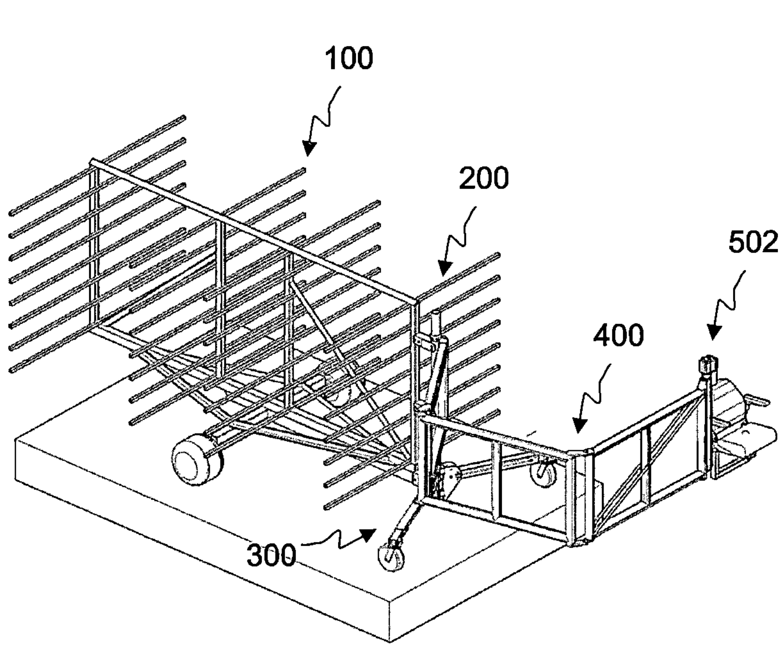
Figure 4:
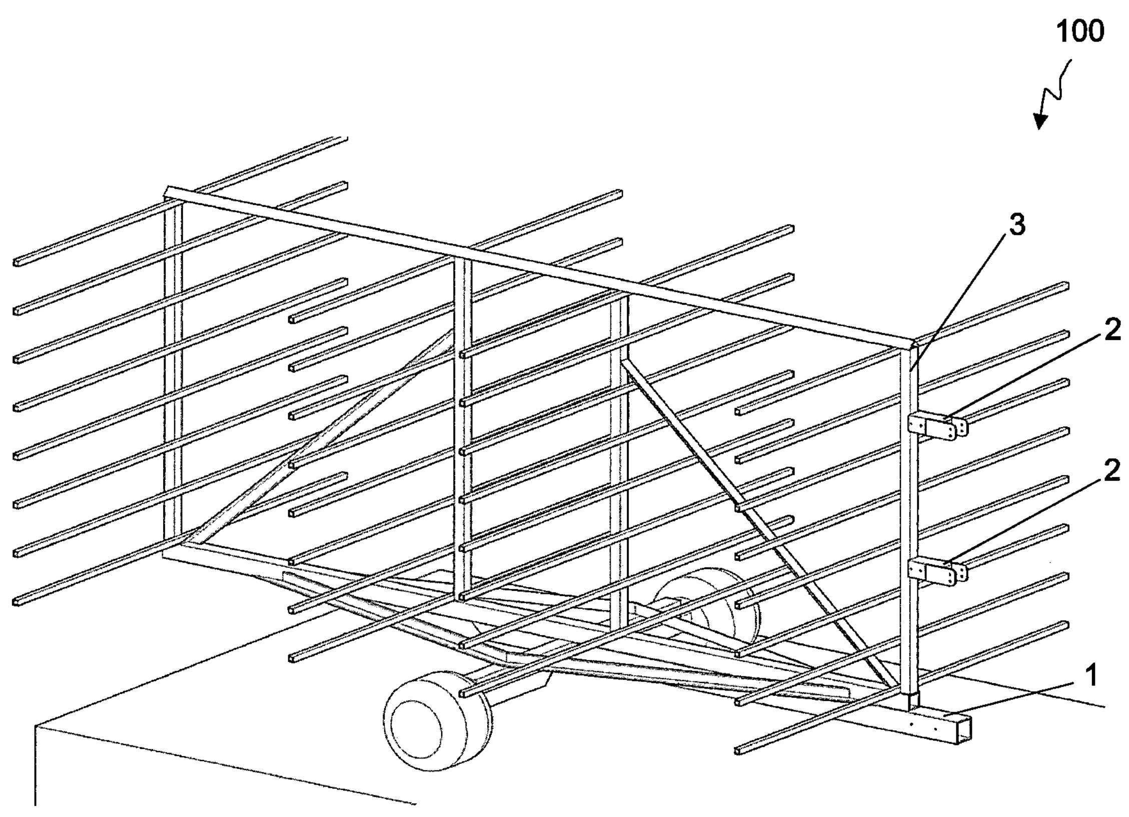
FIG. 4 shows an oblique right rear view of a typical object to which an assembly embodiment of the present disclosure may be mounted in accordance with an embodiment of the present disclosure, highlighting typical mounting points for the assembly's support structure.

Referring to FIGS. 1-3, there are shown lifting and load-transferring apparatuses 10, 11, and 12 in accordance with embodiments of the present disclosure. FIG. 1 represents an embodiment of the present disclosure with a mounting object 100 to which the apparatus 10 is mounted, consisting of a main vertical support beam assembly 200 incorporating an outrigger assembly 300 with casters, and connected in sequence to extensions 400 and powered parallel-arm lift arm assembly fork adapter option 500. FIG. 2 represents an embodiment of the present disclosure with a mounting object 100 to which the apparatus 11 is mounted, consisting of a main vertical support beam assembly 200 incorporating outriggers 300 with casters, and connected in sequence to extensions 400 and powered parallel-arm lift arm assembly with platform adapter option 501. FIG. 3 represents an embodiment of the present disclosure with a mounting object 100 to which the apparatus 12 is mounted, consisting of a main vertical support beam assembly 200 incorporating outriggers 300 with casters, and connected in sequence to extensions 400 and powered parallel-arm lift arm assembly with seat adapter option 502.

Figure 5:
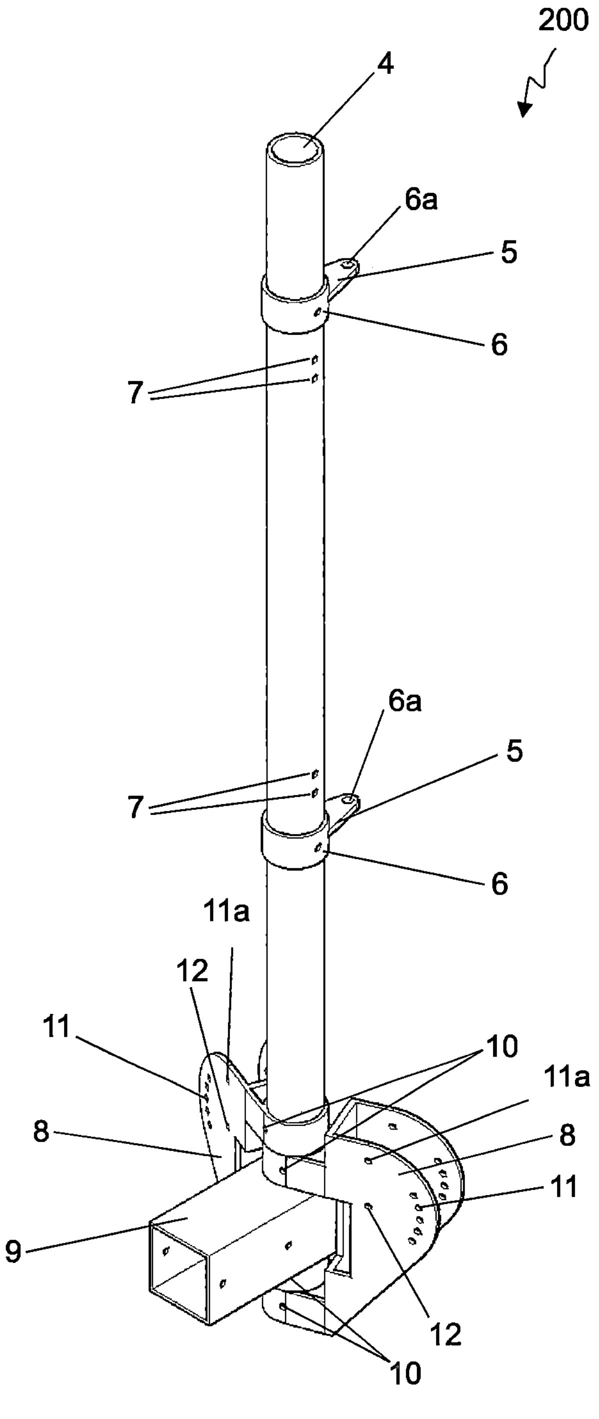
FIG. 5 shows an oblique assembly view of a vertical support beam in accordance with an embodiment of the present disclosure, and outrigger pivot joints.
Figure 5A:
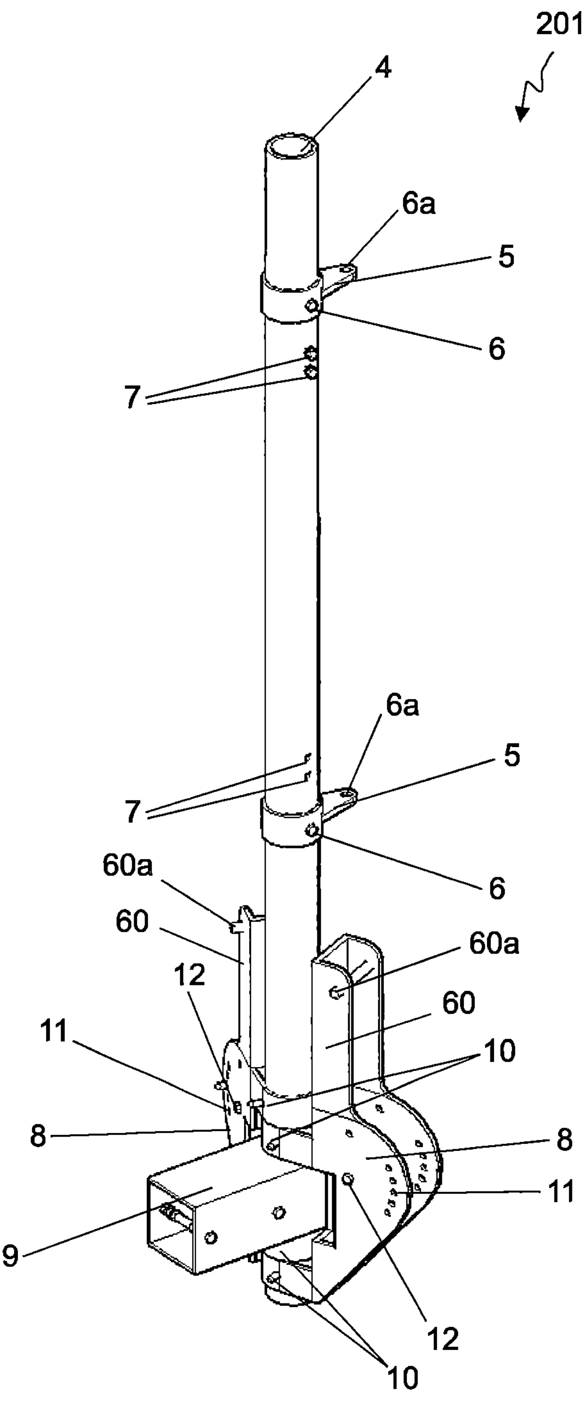
FIG. 5*a* shows an oblique assembly view of a vertical support beam in accordance with an embodiment of the present disclosure, and outrigger pivot joints in a version compatible with powered outrigger actuation.

Beginning from the left of apparatuses 10, 11, and 12, as shown in FIGS. 1-3, and moving rightward, assembly 200 is secured to mounting object 100 by means of mounting points and supports 1, 2, 3, as shown in FIGS. 4, 6, 6*e*, 6*f*, 6*g*. Mounting points 1, 2, 3 are securely fastened to vertical support beam 4 through connection holes 7 and insertion into mounting object interface tube 9, as shown in FIGS. 5 and 5*a*. At this point it should be noted that a wide variety of connection methods and materials could allow vertical support beam 4 to be connected to mounting object 100, including but not limited to screws, clamps, glues, or other popular methods of binding. Vertical support beam 4 could also be integrated into mounting object 100, or utilize an appropriate structure within mounting object 100. Vertical support beam hinge tabs are secured through holes 6 into vertical support beam 4, and incorporate vertical support beam hinge tab pivot holes 6*a* for the purpose of allowing system first extension 401 (FIGS. 8 and 9) to rotate freely about a substantially vertical axis. It should be noted that the tubular design of vertical support beam 4 presents an advantage from a manufacturing perspective of allowing a single part to provide a central axle for outrigger pivot assemblies 8 (FIGS. 5 and 5*a*) while giving vertical support beam hinge tabs 5 positional adjustability depending on where vertical support beam hinge tab hole 6 is drilled. Mounting object interface tube 9 provides a clear advantage from a functional and installation perspective, as it may allow for easy mounting and removal of the product as it may be able to be inserted inside of or slid over the outside of existing structure of mounting object 100. In the case where a load to be transferred is of an appropriate weight, mounting object interface tube 9 may also obviate the need for additional mounting hardware such as lower support beam mount 1, and mid support beam mount 2. The unique design of the combination of outrigger pivot assemblies 8, the lower section of vertical support beam 4, and outrigger outer arms 15 (FIGS. 6-6*j*) allows for a combination of a wide variety of rotational angles between outrigger pivot assemblies 8 and mounting object 100, in order to accommodate required support vectors when system 10, 11, or 12 is picking loads at various angles.

In the outrigger assembly 300 with casters variant of apparatuses 10, 11, and 12, and as shown in FIGS. 5 and 5*a*, the system is constructed substantially as described above, with the addition that the combination of outrigger outer arm assembly hole 12 and outrigger outer arm angle adjustment holes 11, plus outrigger outer arm stowage holes 11*a*, allow a standard locking pin to be placed either in the array of holes of outrigger outer arm angle adjustment holes 11 for a variety of angles to accommodate various terrains, or stowage when placed in outrigger outer arm stowage holes 11*a* in alignment with outrigger outer arm positioning hole 14. Continuing downward and outward, and with reference to FIGS. 6-6*j*, outrigger assembly 300 with casters incorporates outrigger outer arm 15, outrigger inner arm 17, caster mount 20, and caster 21. The total length of these element can easily be regulated with use of a standard locking pin inserted in outrigger outer arm length adjustment hole 16 to enter into a plurality of holes 17*a* to accommodate various required lengths when lifting variously cantilevered loads on uneven terrain. Since various angular adjustments of outrigger outer arm 15 change the plane of rotation of caster assembly 21, it is preferable to have a design that allows correction of a vertical rotational axis of caster assembly 21. The design of caster mount 20 accomplishes this by incorporating a radial slot, caster mount swivel slot 18, which when interacting with caster mount swivel hole 19, creates a secure mount for caster assembly 21 and a substantially vertical axis of rotation of caster 21 when bolts are placed through caster mount swivel holes 19 and outrigger inner arm caster mount swivel slot hole 18*a*.

Figure 6:
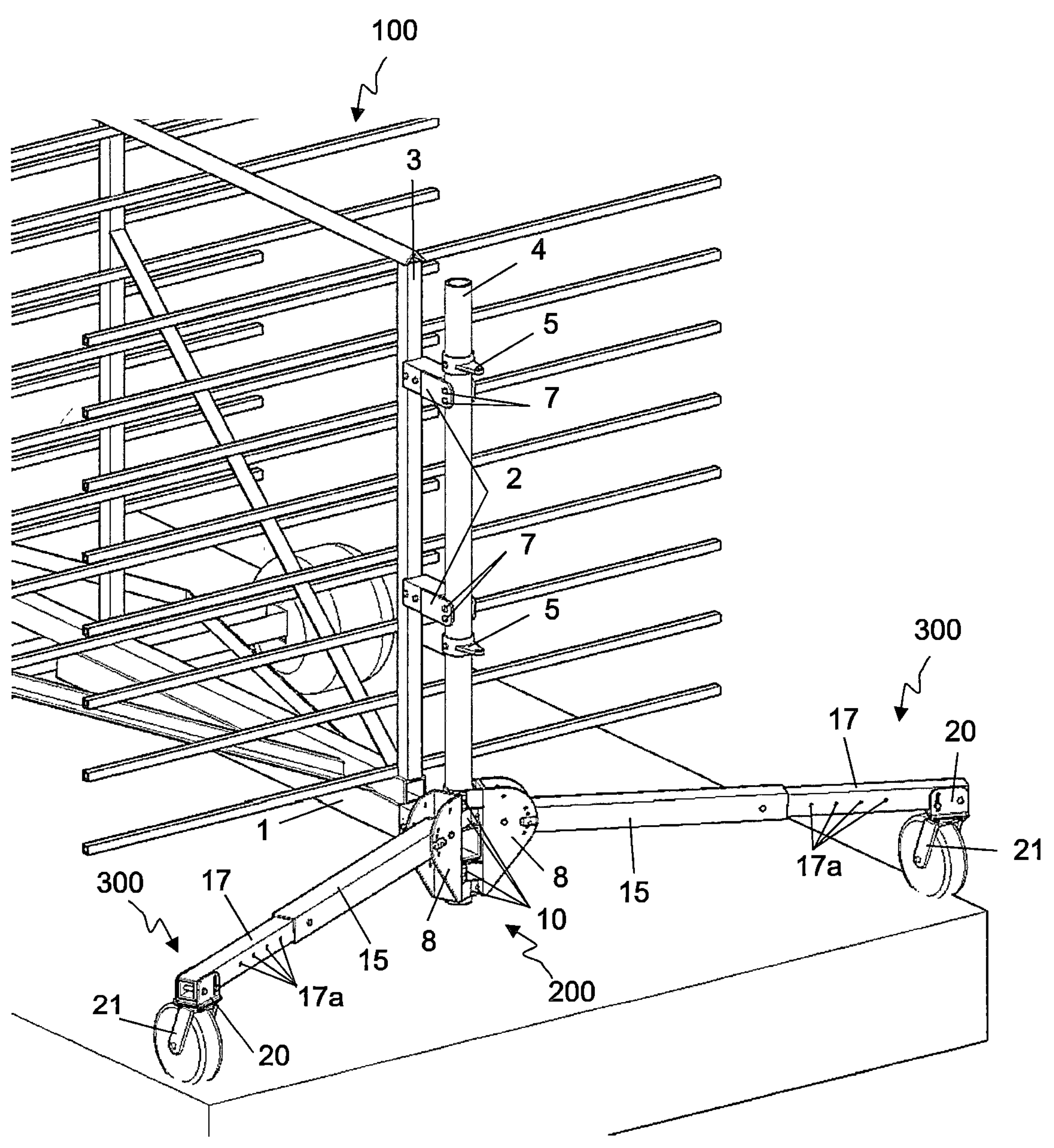
FIG. 6 shows a view of a main vertical support beam, a hinged joint of an outrigger assembly, and outriggers with the outriggers in a horizontal/deployed position in accordance with an embodiment of the present disclosure.
Figure 6A:
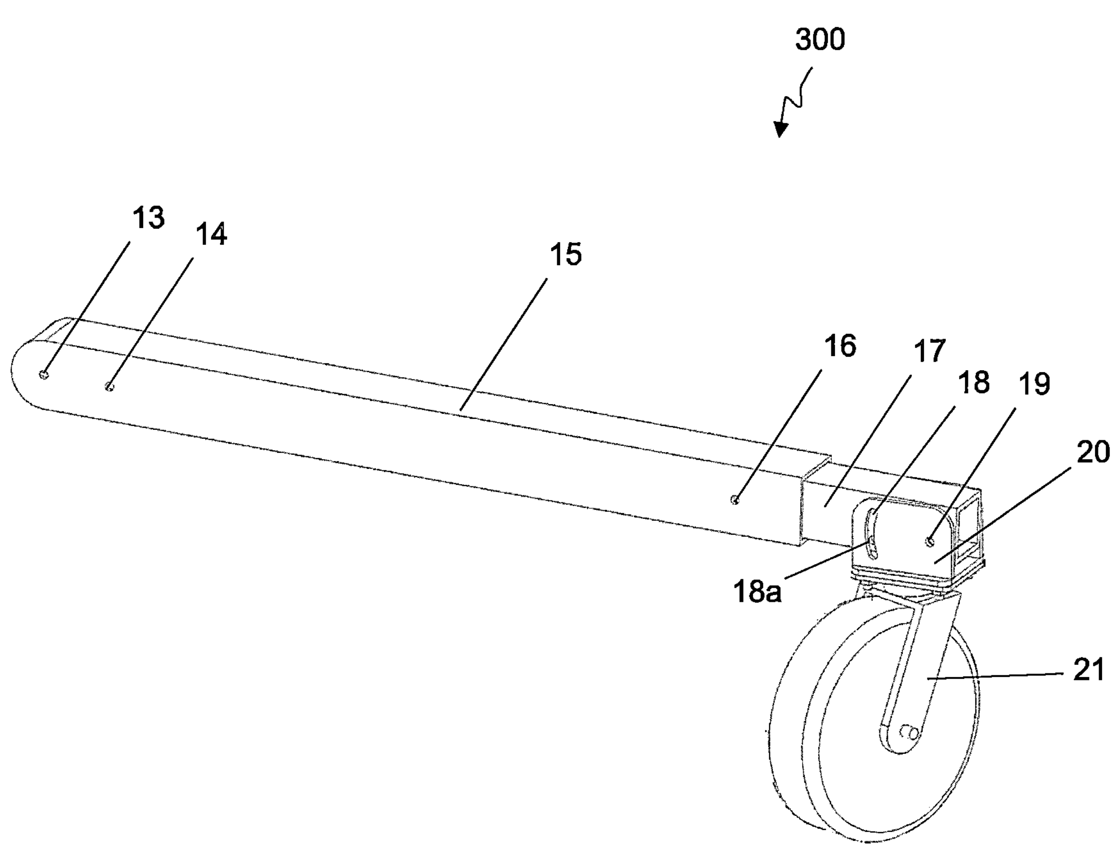
FIG. 6*a* shows an oblique view of an outrigger with caster assembly in accordance with an embodiment of the present disclosure, with the outrigger in a horizontal/deployed position and fully retracted.
Figure 6B:
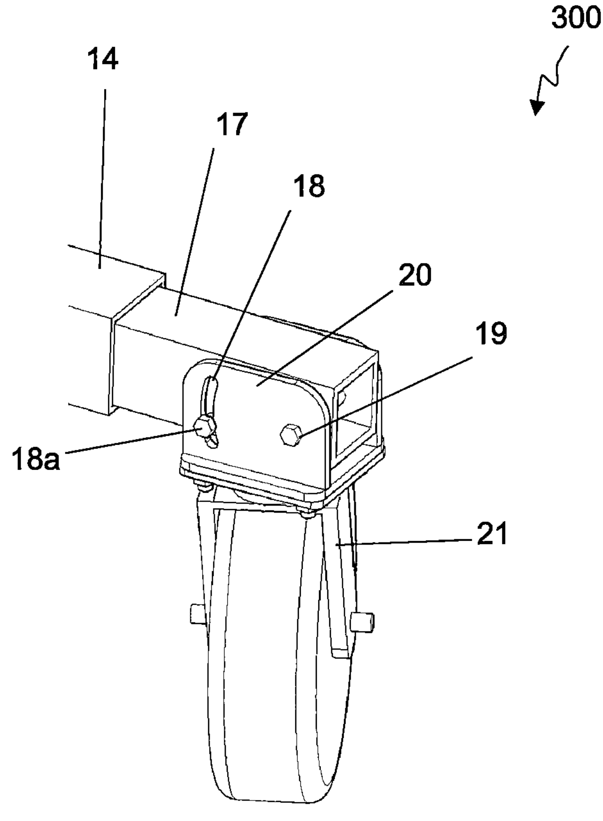
FIG. 6*b* shows an oblique detail view of an end of an outrigger caster assembly in accordance with an embodiment of the present disclosure, with the outrigger in a horizontal/deployed position and fully retracted.
Figure 6C:
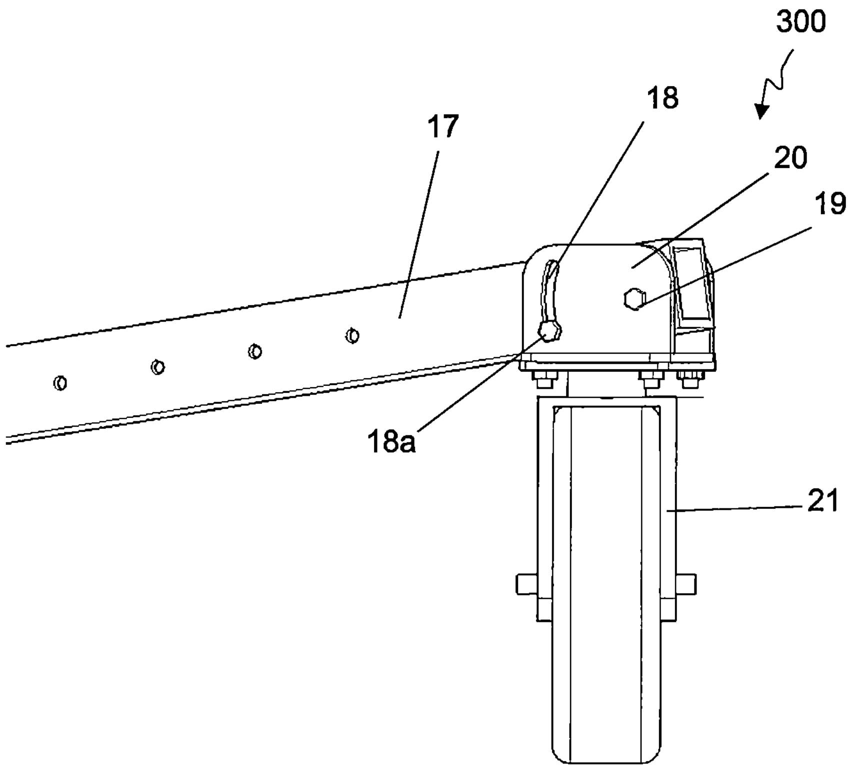
FIG. 6*c* shows an oblique detail view of an end of an outrigger caster assembly in accordance with an embodiment of the present disclosure, with the outrigger in a horizontal/deployed position and fully retracted, with an adjustable mount of a caster arm adjusted to accommodate a maximum elevation of an outrigger arm to which it is attached.
Figure 6D:
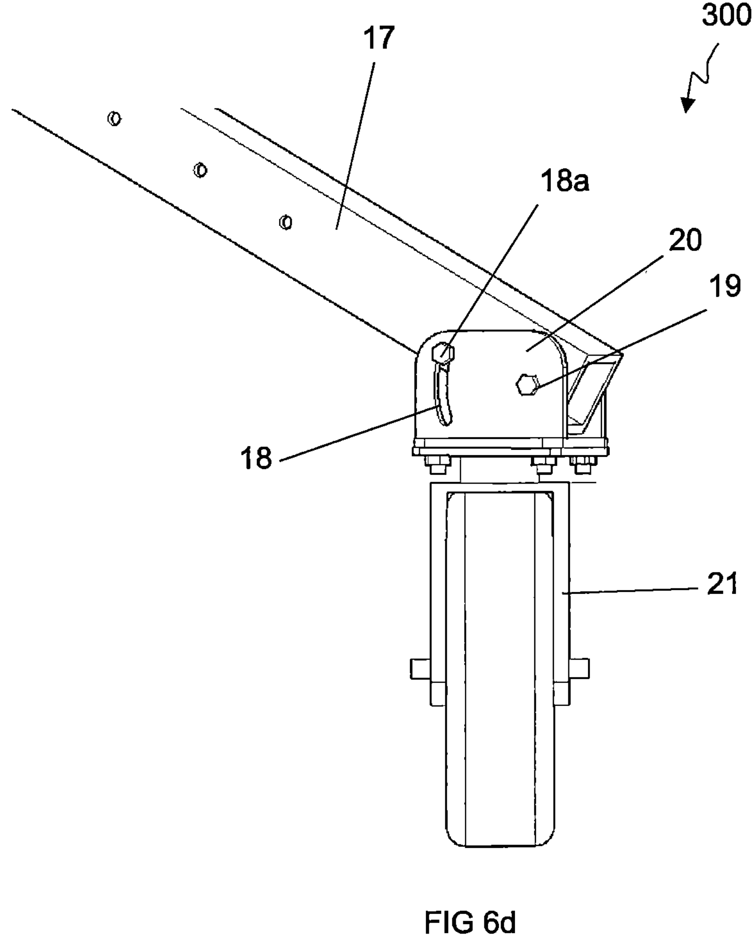
FIG. 6*d* shows an oblique detail view of an end of an outrigger caster assembly in accordance with an embodiment of the present disclosure, with the outrigger in a horizontal/deployed position and fully retracted, with an adjustable mount of a caster arm adjusted to accommodate a minimum elevation of an outrigger arm to which it is attached.
Figure 6E:
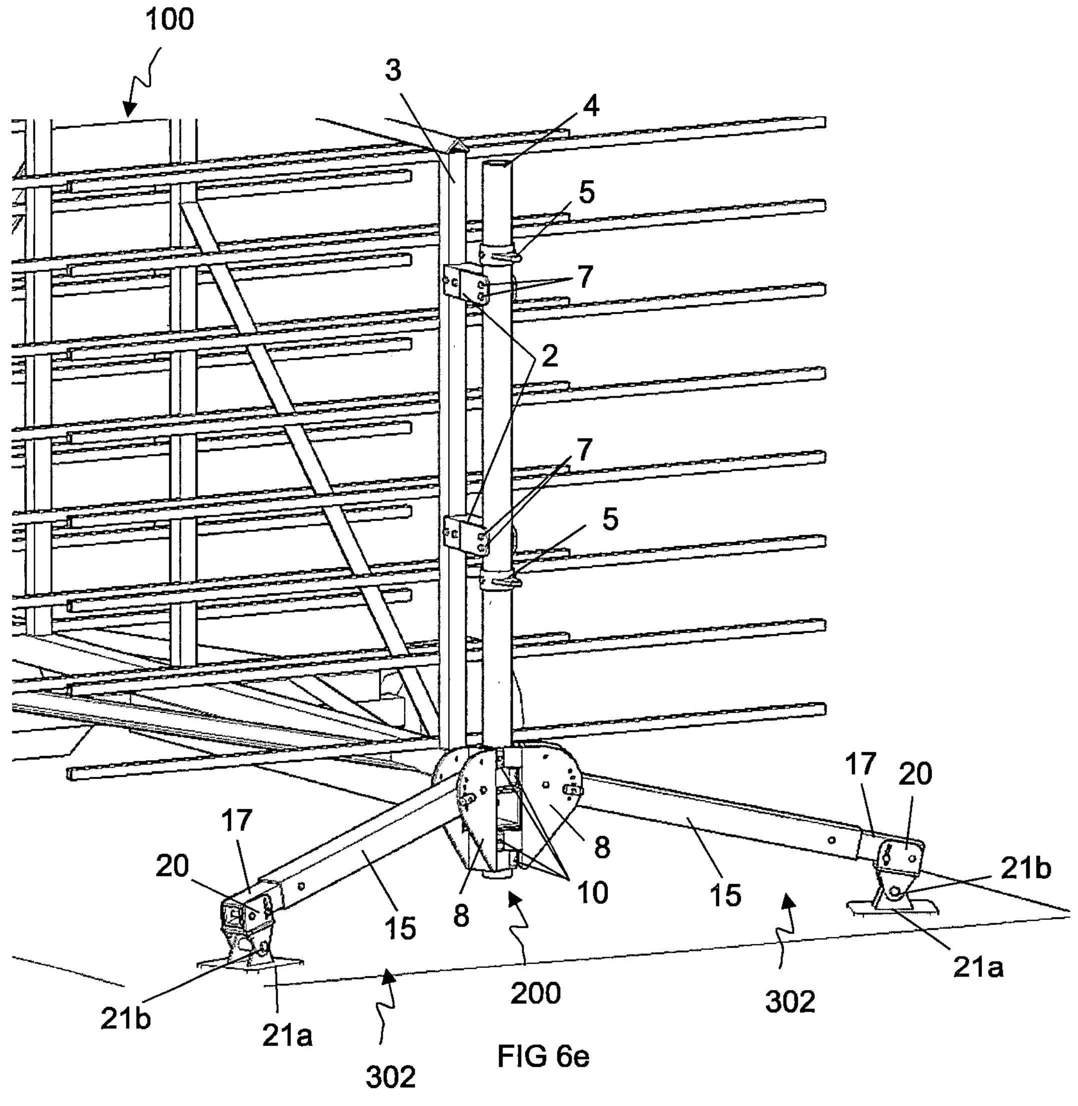
FIG. 6*e* shows an oblique view of outriggers with pad assemblies in accordance with an embodiment of the present disclosure, with the outriggers in a horizontal/deployed position and fully retracted.
Figure 6F:
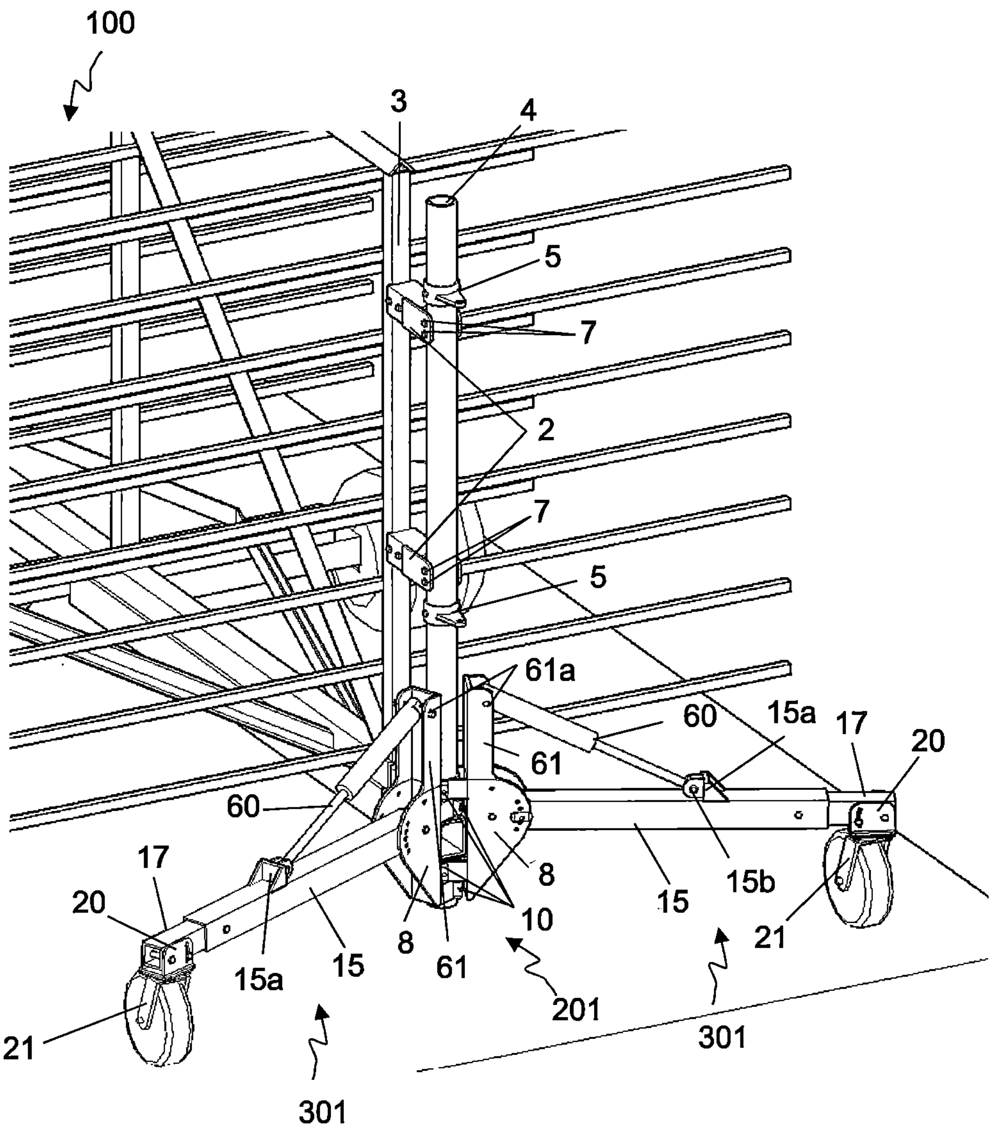
FIG. 6*f* shows an oblique view of outriggers with casters in accordance with an embodiment of the present disclosure, depicting a hydraulic actuation option, with outriggers in a horizontal/deployed position and fully retracted.
Figure 6G:
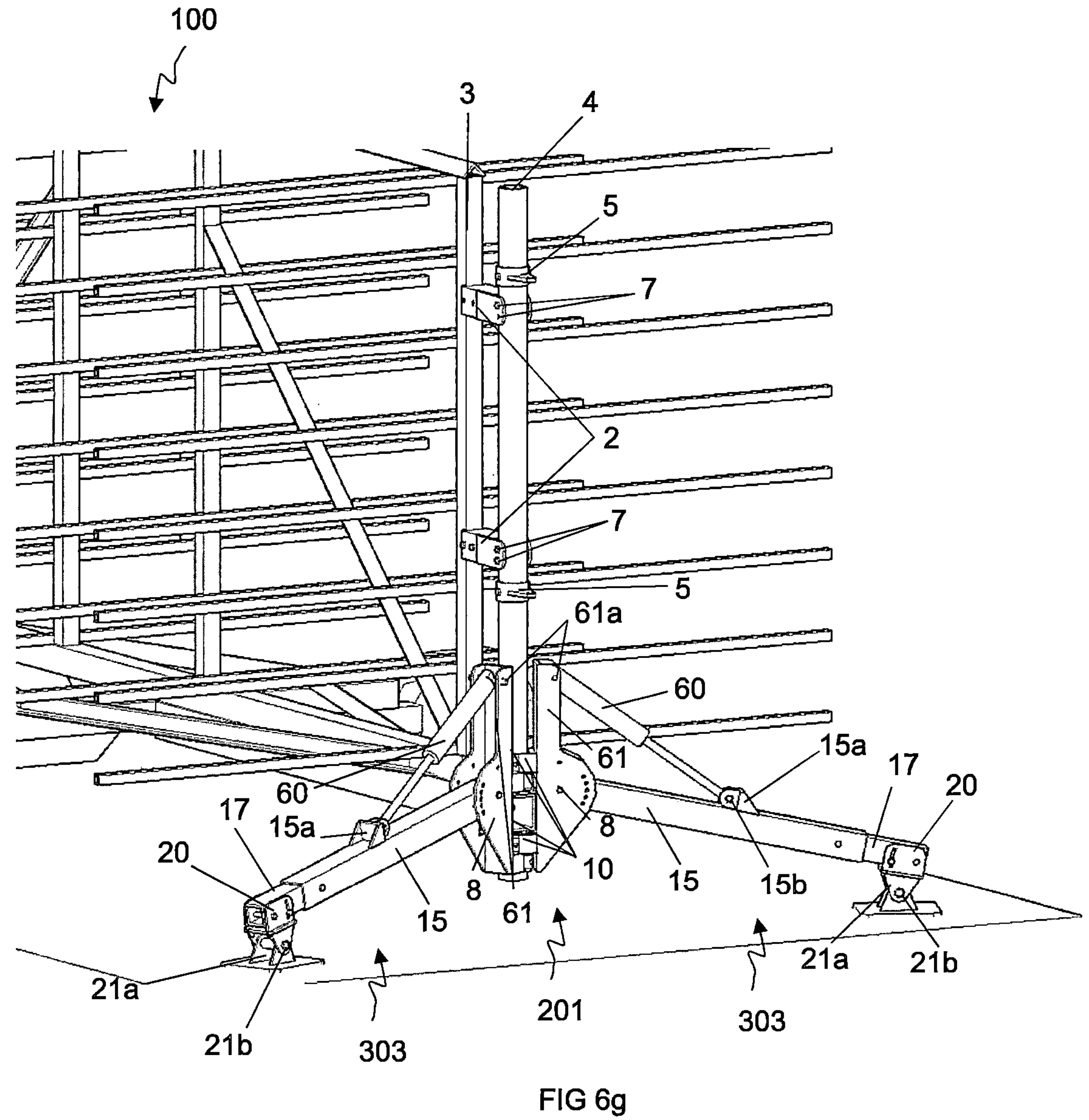
FIG. 6*g* shows an oblique view of outriggers with pad assemblies in accordance with an embodiment of the present disclosure, depicting a hydraulic actuation option, with outriggers in a horizontal/deployed position and fully retracted.
Figure 6H:
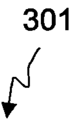
FIG. 6*h* shows an oblique detail view of an outrigger leg with caster assembly in accordance with an embodiment of the present disclosure, in a horizontal/deployed position and fully retracted.
Figure 6H:
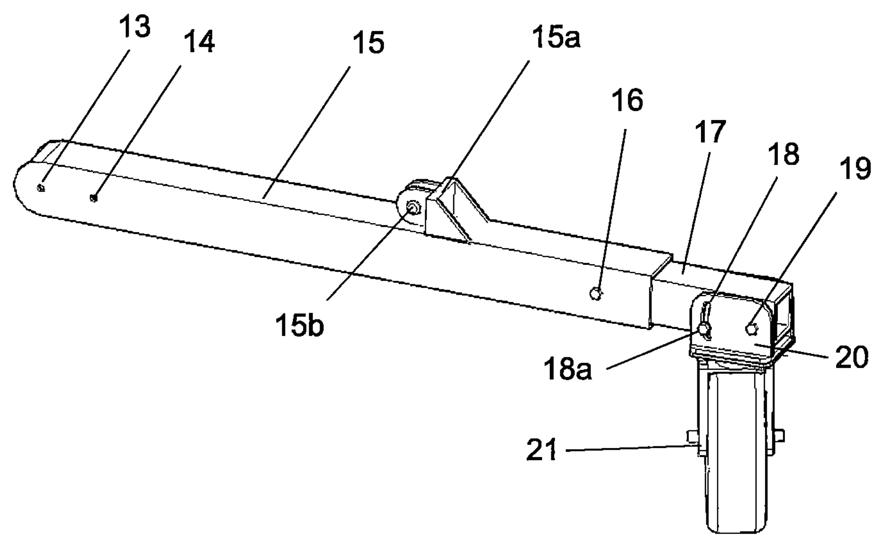
Figure 6I:
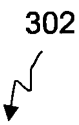
FIG. 6*i* shows an oblique detail view of an outrigger leg with pad assembly in accordance with an embodiment of the present disclosure, in a horizontal/deployed position and fully retracted.
Figure 6I:
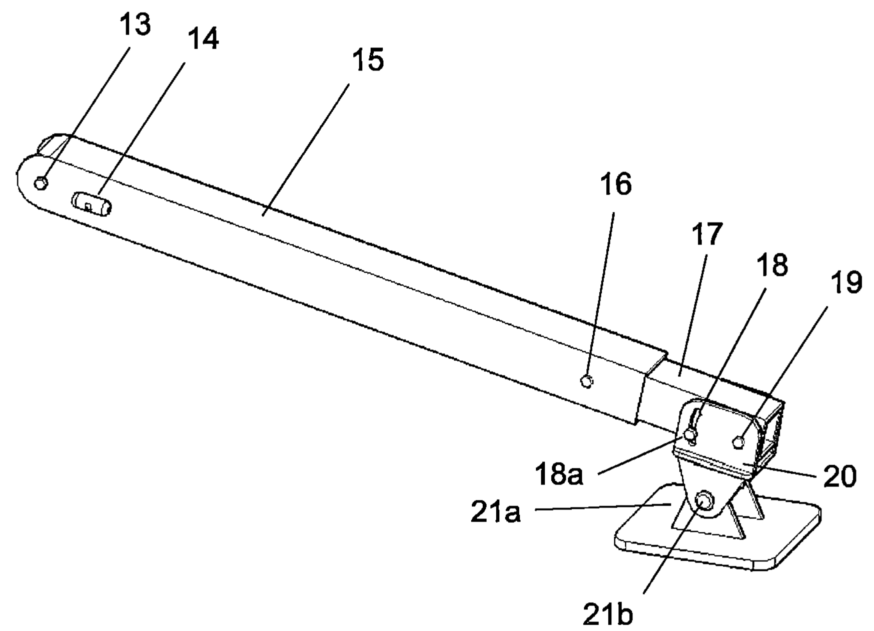

In the outrigger assembly 301 with casters and powered actuation variant of apparatuses 10, 11, and 12, as shown in FIGS. 5*a*, 6*h* and 6*f*, the system is constructed substantially as described above in reference to assemblies 300 and 200, however in lieu of the manual rotation outrigger outer arms 15 and outrigger inner arms 17, the combination of the extension and retraction of outrigger arm actuator 60, connected to pivot points outrigger pivot assemblies actuator extender holes 61*a* at the end of outrigger pivot assemblies actuator extender 61, outrigger outer arm actuator bracket holes 15*b*, and the connection between outrigger outer arm assembly holes 12 and outrigger outer arm pivot holes 13 work jointly to create rotational movement of outrigger outer arm 15 about a substantially horizontal axis. This is useful in high productivity environments where there is uneven terrain and varying loads on mounting object 100 as the time required to reposition an angle of outrigger outer arm 15, and/or a position of caster mount 20 to compensate for differences would be detrimental. The length of the combination of outrigger outer arm 15 and outrigger inner arm 17, as well as the position of caster mount 20, can be regulated as described above in the description of assembly 300.

In the outrigger assembly 302 with pads variant of apparatuses 10, 11, and 12, all aspects of the system function as described above in reference to assemblies 200 and 300, with the exception that caster assembly 21 is replaced by pad assembly 21*a*, as shown in FIGS. 7*a*, 6*e*, 6*g*, 6*i*, 6*j*. Pad assembly 21*a* incorporates pivoting pad assembly joint 21*b* to allow multi-axis pivoting of the joint to match up to uneven terrain. An additional advantage of this style of connection with the ground below assembly 302 is that it spreads the load over a much wider surface area than the caster assemblies 21 whose contact surfaces are limited to small areas at the bottom of their wheels. This is clearly an advantage in soft terrains where penetration into soil can cause deflection in the entire system especially under heavy loads.

Figure 6J:
FIG. 6*j* shows an oblique detail view of an outrigger leg with pad assembly in accordance with an embodiment of the present disclosure, depicting a hydraulic actuation option, in a horizontal/deployed position and fully retracted.
Figure 6J:
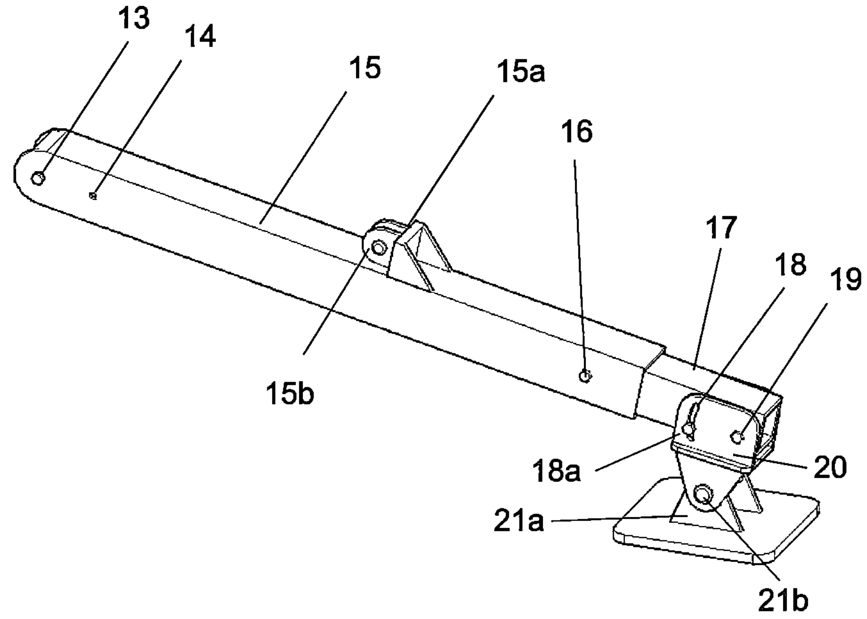
Figure 7:
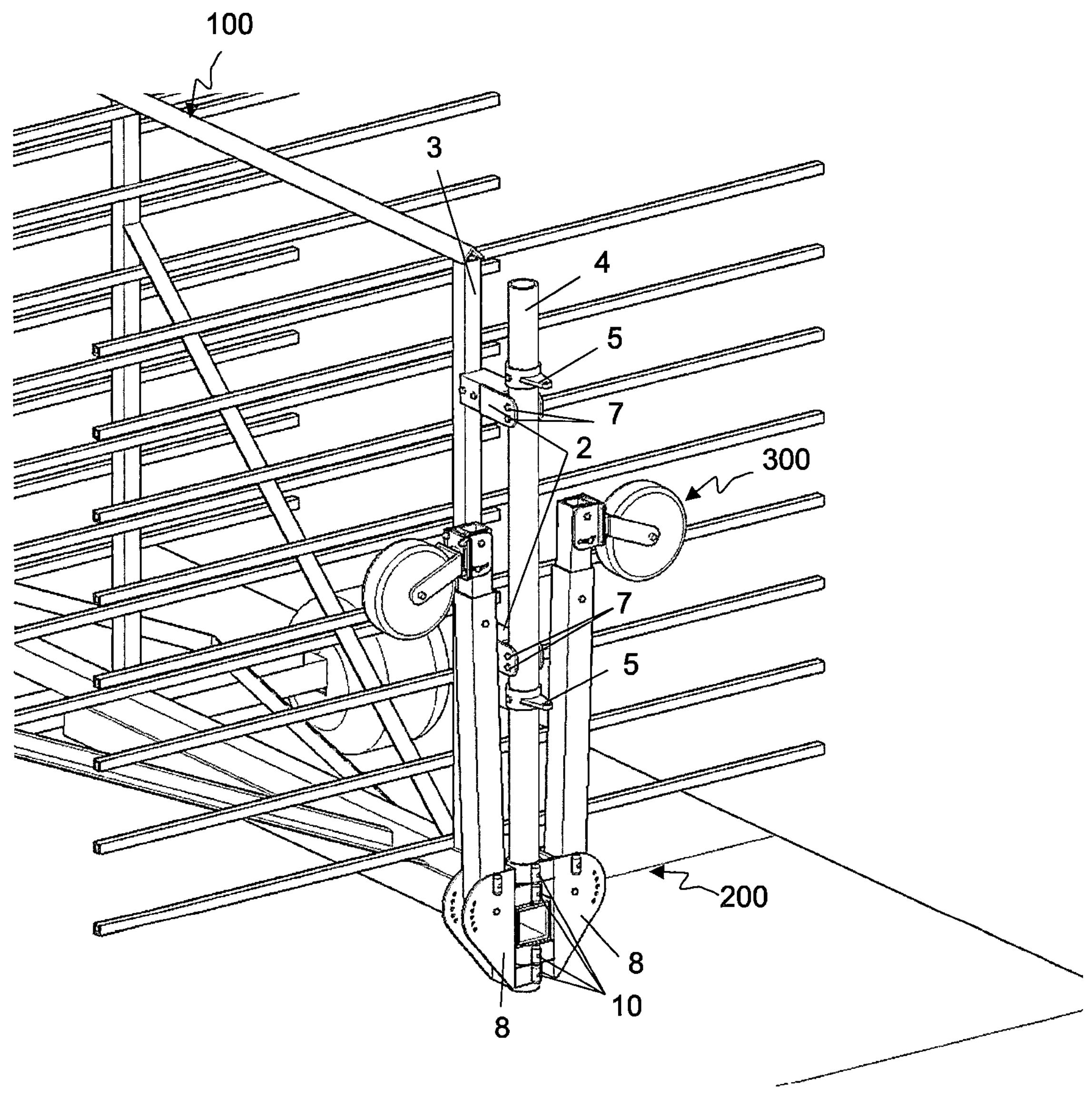
FIG. 7 shows a view of a main vertical support beam, a hinged joint of an outrigger assembly, and outriggers with caster assembly, with the outriggers in a vertical/stowed position in accordance with an embodiment of the present disclosure.
Figure 7A:
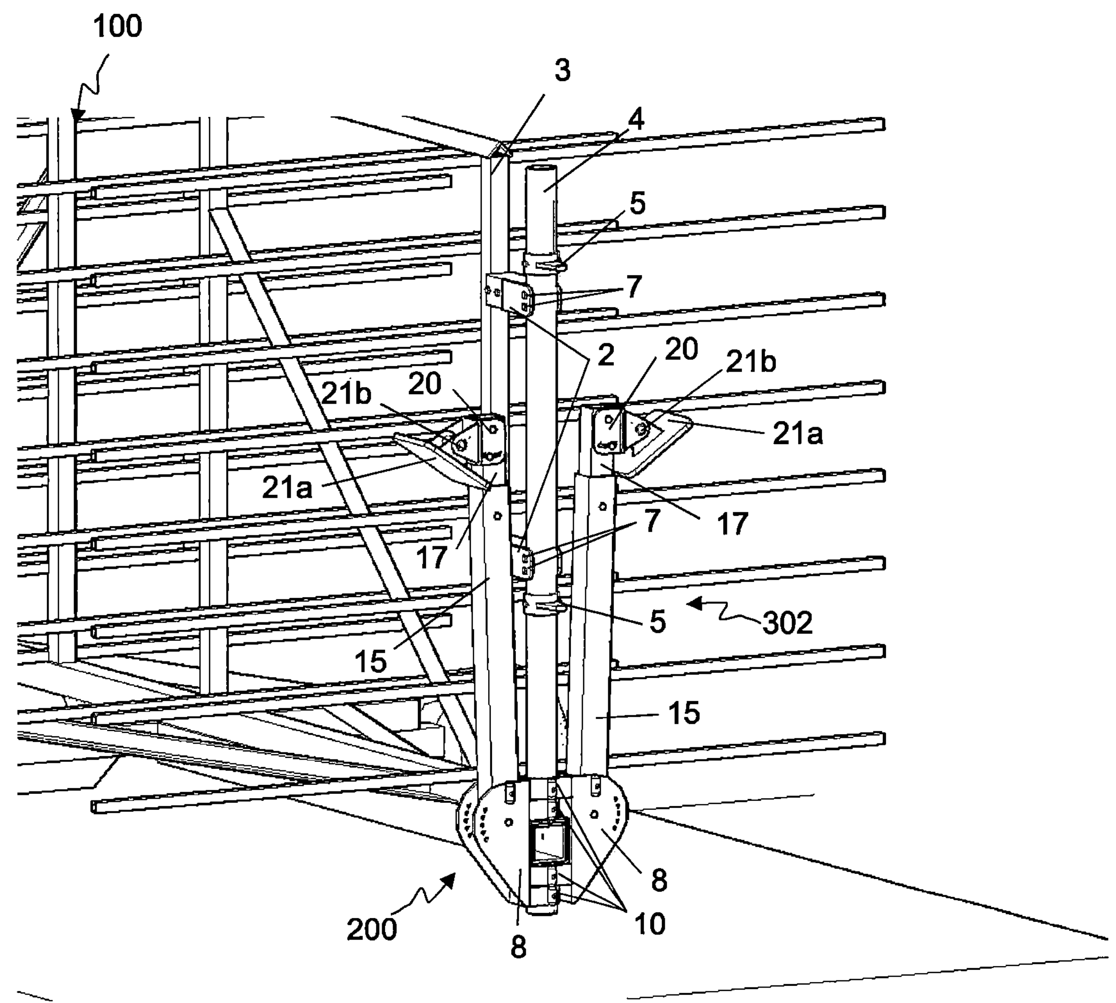
FIG. 7*a* shows a view of a main vertical support beam, a hinged joint of an outrigger assembly, and outriggers with pad assemblies, with the outriggers in a vertical/stowed position in accordance with an embodiment of the present disclosure.
Figure 7B:
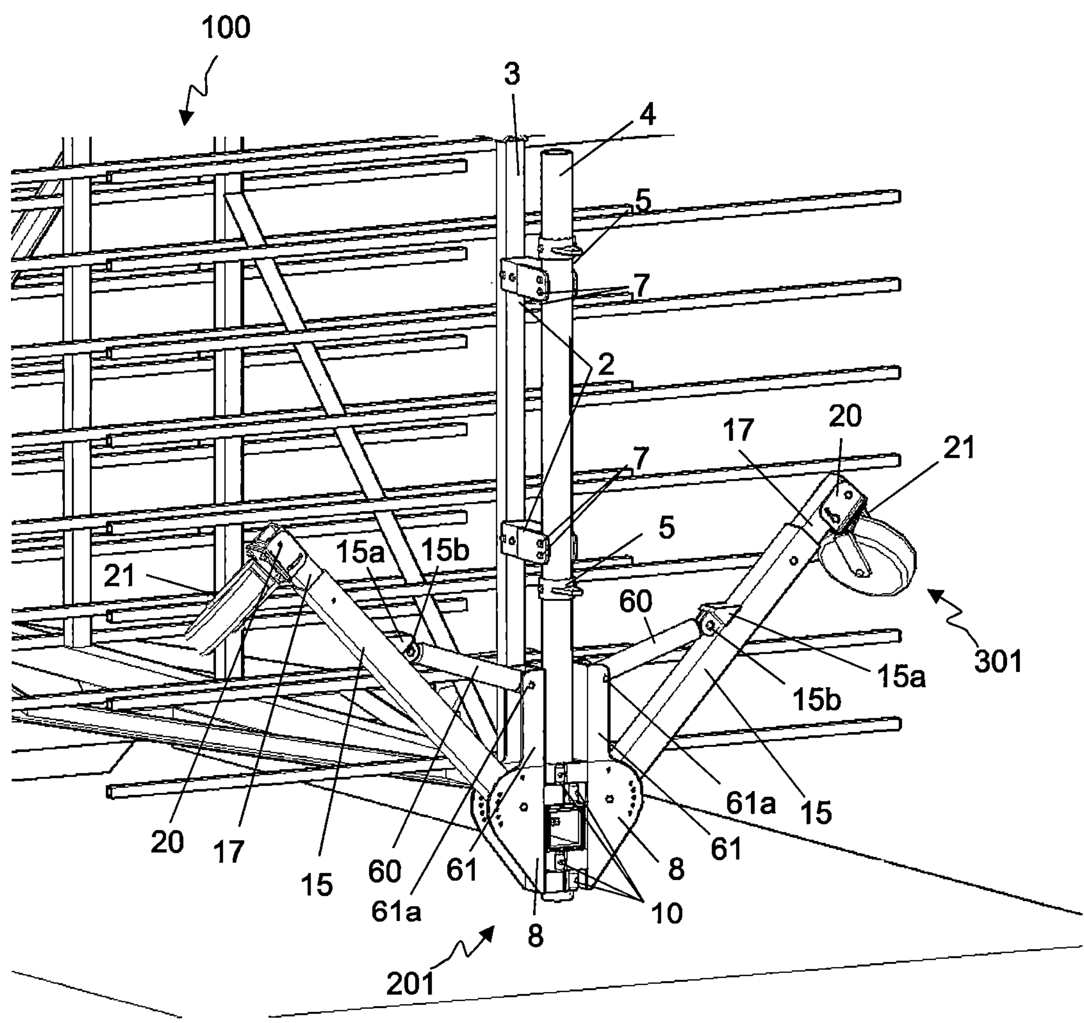
FIG. 7*b* shows a view of a main vertical support beam, a hinged joint of an outrigger assembly, and outriggers with caster assemblies, depicting a hydraulic actuation option, with the outriggers in a vertical/stowed position in accordance with an embodiment of the present disclosure.
Figure 7C:
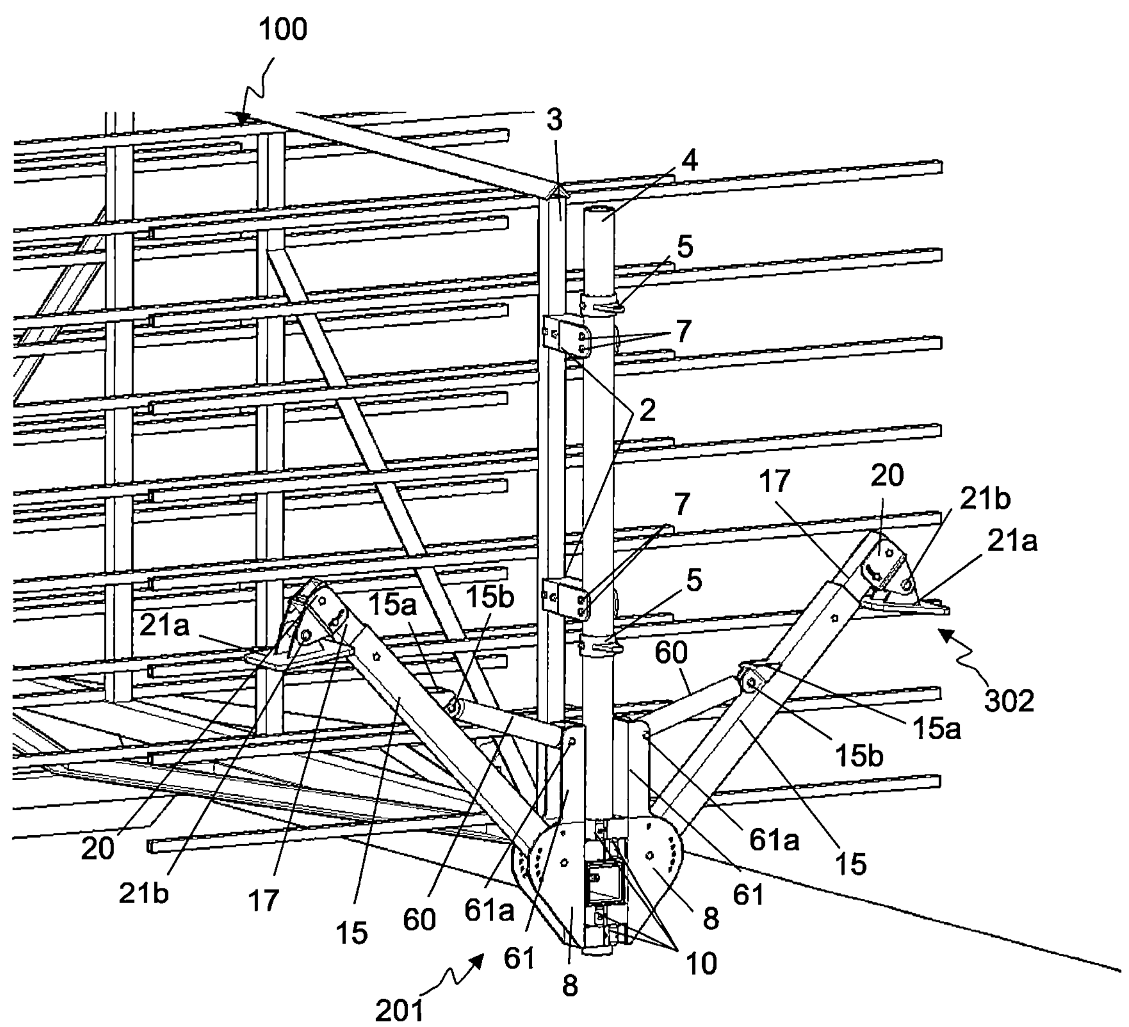
FIG. 7*c* shows a view of a main vertical support beam, a hinged joint of an outrigger assembly, and outriggers with pad assemblies, depicting a hydraulic actuation option, with the outriggers in a vertical/stowed position in accordance with an embodiment of the present disclosure.

In the outrigger assembly 303 with pads and powered actuation variant of apparatuses 10, 11, and 12, all aspects of the system function as described above in reference to assemblies 200 and 301, with the exception that caster assembly 21 is replaced by pad assembly 21*a* as shown in FIGS. 6*g* and 7*c*, features of which are discussed with reference to assembly 302 and referenced in FIG. 6*j*.

Figure 8:
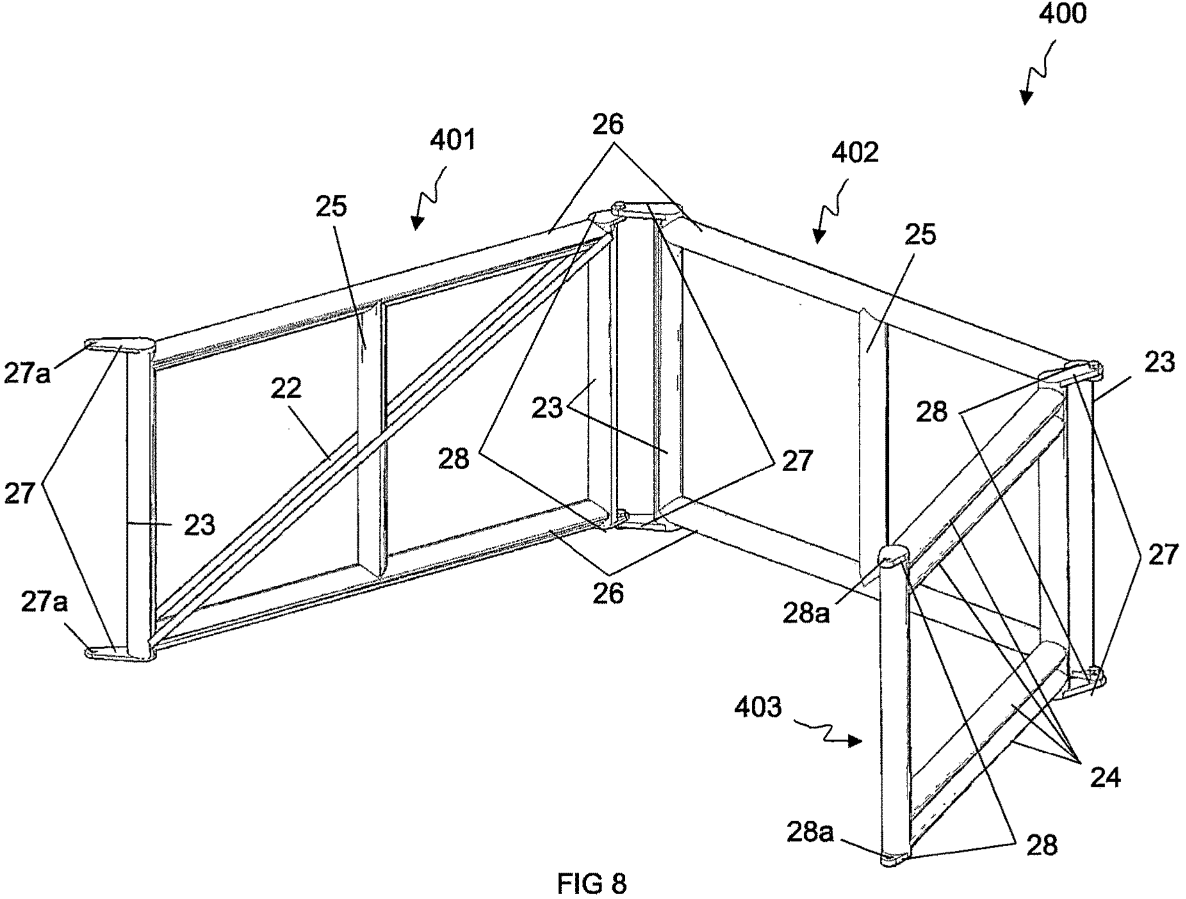
FIG. 8 shows an oblique view of extensions that connect a lift arm assembly and a support structure assembly in accordance with an embodiment of the present disclosure.
Figure 9:
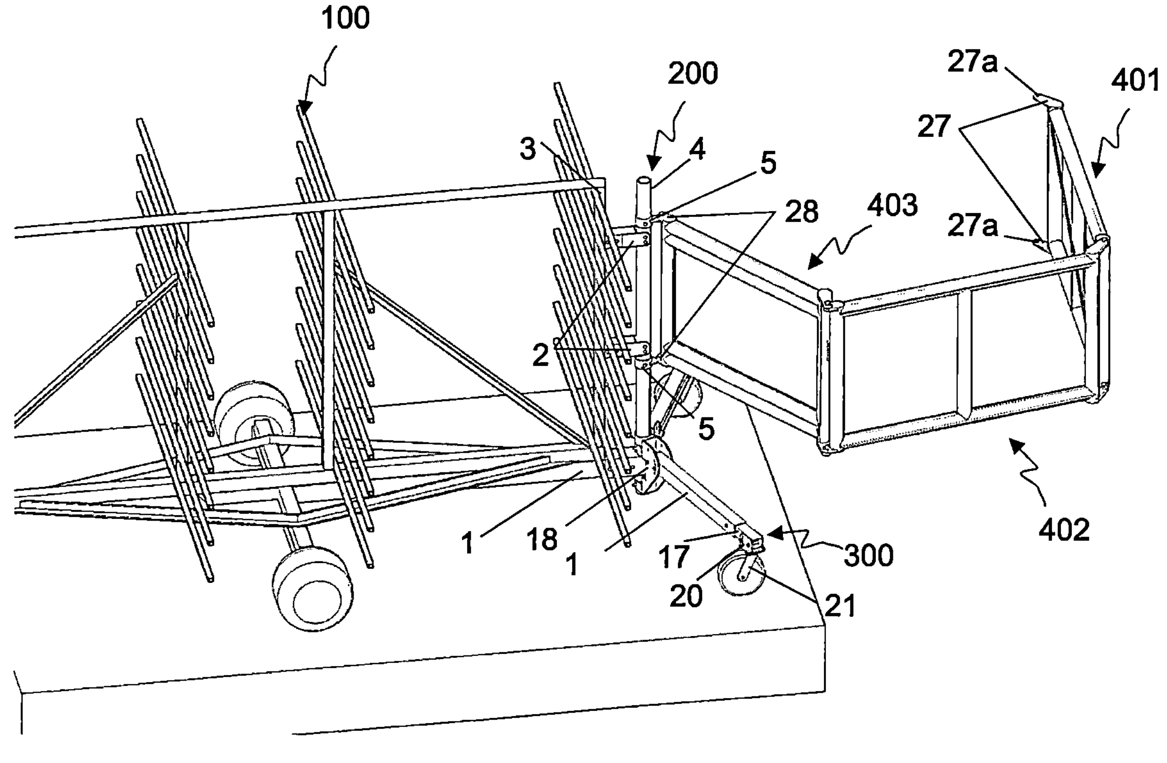
FIG. 9 shows an oblique rear view of a typical object to which an embodiment of the present disclosure is mounted, with a vertical support beam, deployed outriggers, and multiple articulated extensions attached to the vertical support beam in accordance with an embodiment of the present disclosure.
Figure 14:
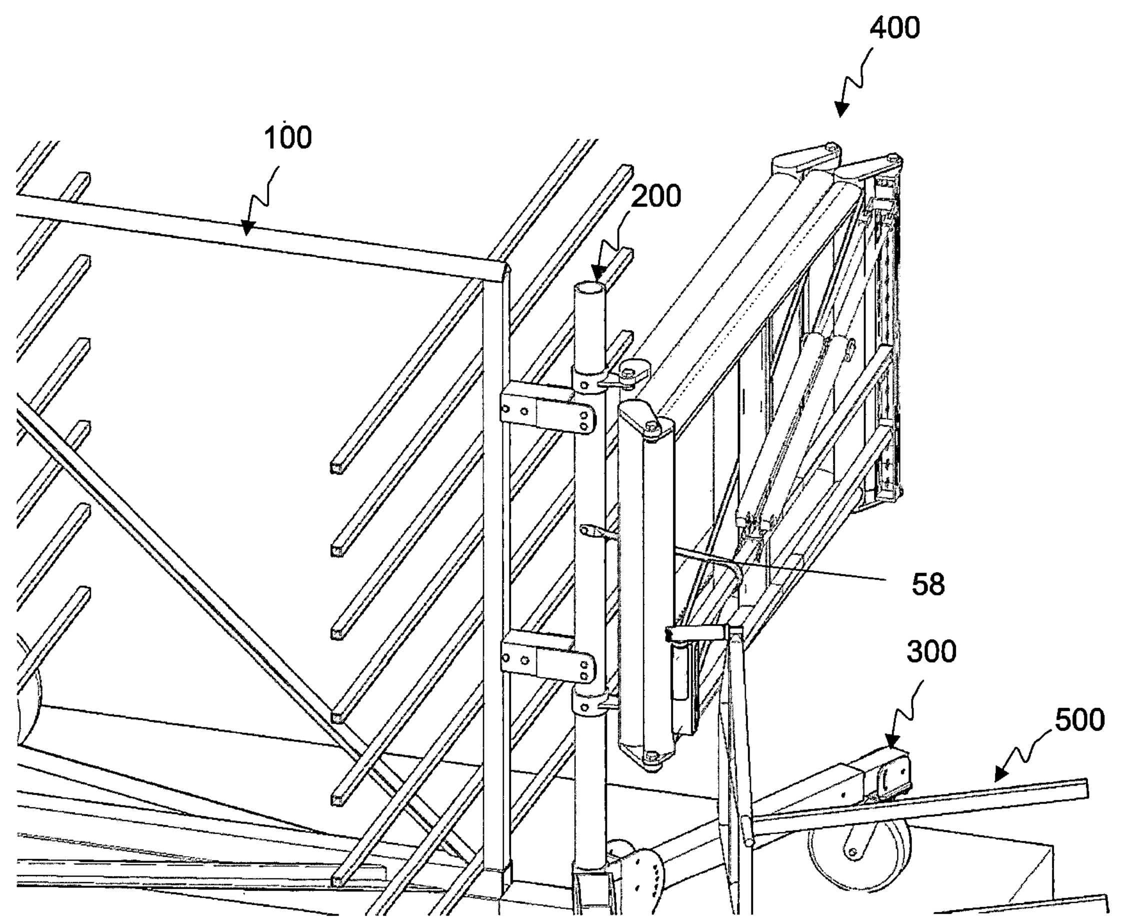
FIG. 14 is an oblique view of a lifting and load transferring apparatus in accordance with an embodiment of the present disclosure, showing a view of extensions and a lift arm assembly in a stowed position, with an upper parallel arm of a powered parallel-arm lift assembly engaged with a docking capture arm attached to a main vertical support, securing the upper parallel arm and the entire apparatus when the lift is not in use.
Figure 14A:
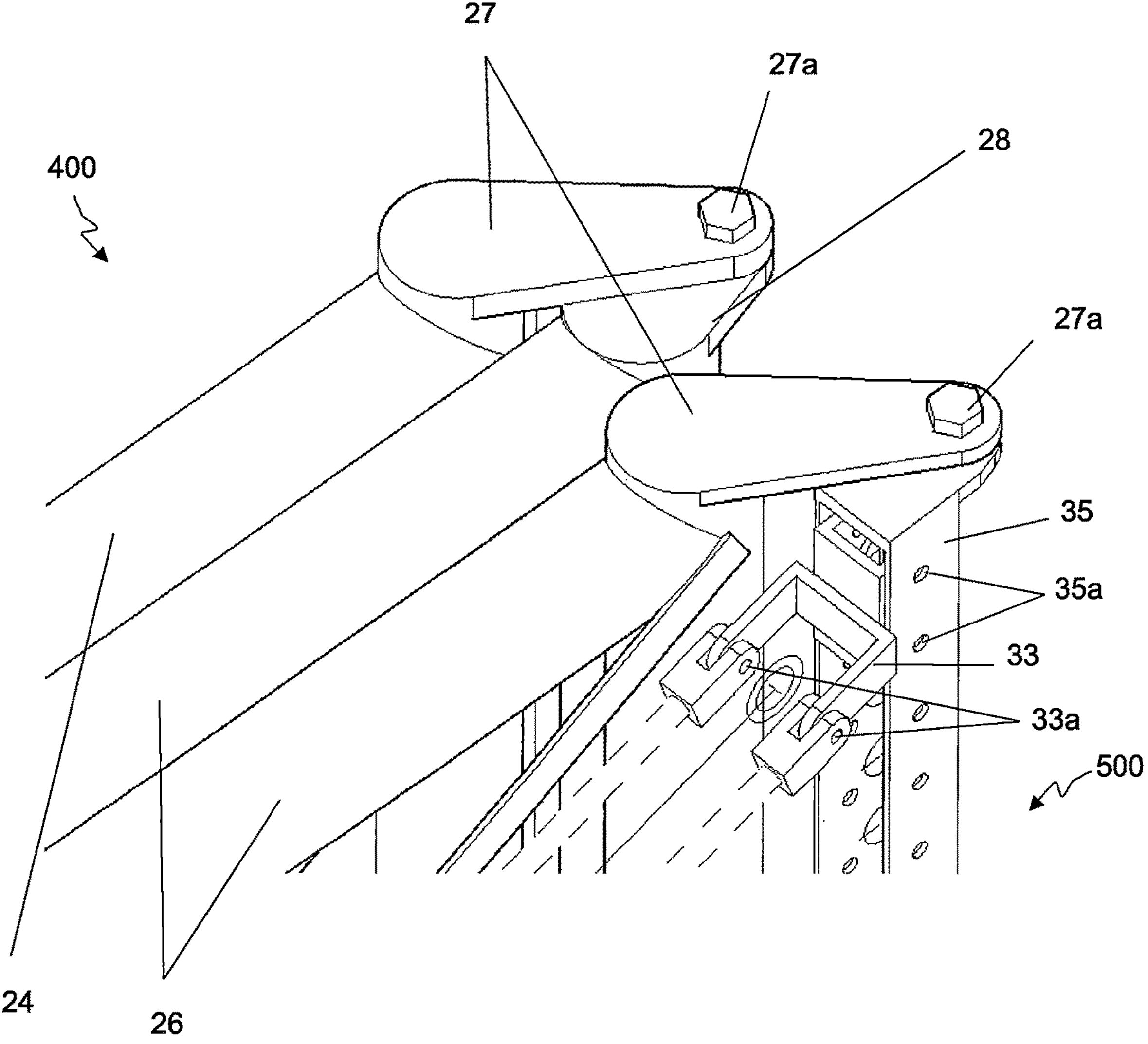
FIG. 14*a* is a detail view of FIG. 14 showing how hinges of the extensions interlock in the stowed position in accordance with an embodiment of the present disclosure.

Continuing rightward, FIGS. 8, 9, 14 and 14*a* refer to extensions assembly 400, as well as first extension 401, second extension 402, and third extension 403. FIG. 8 shows an array of three extensions, first extension 401, second extension 402, and third extension 403. Beginning at the left side of first extension 401, extension hinge joint tab long 27 is fixedly attached to extension side vertical support 23, which is in turn fixedly attached to extension upper and lower horizontal support 26 at both the top and bottom of extension side Vertical support 23. Extension center vertical support 25 is fixedly attached in between the upper and lower extension upper and lower horizontal support 26. At the right of system 401 is fixedly attached an additional extension side vertical support 23, with two extension hinge joint tab short 28 fixedly attached at the top and bottom. It should be noted that extension hinge joint tab long 27 is attached to extension side vertical support 23 at such an angle as to permit flat folding when system 400 is folded for stowage as shown in FIG. 14. Thus, upper and lower extension hinge joint tab holes 27*a* are located so as to align with upper and lower vertical support beam hinge tab pivot holes 6*a* of assembly 200, in such a manner as to provide free rotation about a substantially vertical axis. In similar fashion, at the joint between first extension 401 and second extension 402, extension hinge joint tab long hold 27*a* upper and lower of second extension 402 are positioned so as to interface with extension hinge joint tab short hole 28*a* in such a manner as to provide free rotation about a substantially vertical axis running through both holes. Connections and interaction between third extension 403 and second extension 402 are as described immediately above as between first extension 401 and second extension 402. In the interest of maximizing strength to weight ratio, and to avoid potential for sagging when under load, extension sag support straps 22 may be added to extensions 401, 402, or 403. It should also be noted that additional extensions as depicted in first extension 401, second extension 402, and third extension 403 can be added as needed as per requirements of a particular lifting and loading environment. From a user and functional perspective, the assembly 400 offers a particularly advantageous design combination of torsional rigidity, wide-ranging three-dimensional movement and placement of a load to be transferred, and the ability to be stowed relatively flat so as to minimize space occupied when not in use. The unique design of the extension 401, 402, and 403 typically incorporate round tubes for vertical and horizontal supports 25, 23, 26, 24, which have superior torsional rigidity and strength-to-weight ratio characteristics as compared to other shapes of tubing or solid media. Although the disclosed design refers to round tubing as the construction material of choice for these elements, the present disclosure should not be limited in scope by this particular embodiment of these support members, thus square, rectangular, triangular, and/or other solid shapes should be considered within the scope of the present disclosure.

Continuing rightward, FIGS. 2, 11, 13, 13*a*, and 13*b* disclose apparatus 11 and parallel-arm lift arm assembly 501 with platform adapter picking device. Beginning at the left and moving rightward, extension assembly 401 extension hinge joint tab long hole 27*a* upper and lower are designed to align with parallel-arm lift arm assembly vertical support beam pivot tab hole 32*a* upper and lower so that the two pairs may be bolted together in such a manner as to allow rotation between assembly 401 or any other subsystem of system 400 or even system 200 and system 501 about a substantially vertical axis. Upper and lower parallel-arm lift arm assembly vertical support beam pivot tabs 32 are fixedly attached at the top and bottom of parallel-arm lift arm assembly vertical beam 35. Parallel-arm lift arm assembly vertical beam adjustment holes 35*a* are an array of holes that can be used alternately as connection points for parallel arms 41 and actuator mount parallel-arm lift arm assembly vertical beam side 33. Parallel arm lift assembly actuator 39 incorporates a hole that is pivotally attached to actuator mount parallel arm lift arm assembly vertical beam side 33 by means of a bolt or other axle inserted into actuator mount parallel-arm lift arm assembly vertical beam side hole 33*a*, thus allowing rotation about a substantially horizontal axis. Similarly, a combination of a provided hole in the lower section of parallel arm lift assembly actuator 39, actuator mount parallel-arm lift arm assembly parallel arm side 40, and actuator mount parallel-arm lift arm assembly parallel arm side hole 40*a* allow rotation about a substantially horizontal axis between actuator 39 and parallel arm 41. In further similar fashion, parallel-arm lift arm assembly parallel arm hole 41*a* is provided at each end, allowing holes on the left and to be engaged with holes 35*a* in various locations, allowing again for rotation about a substantially horizontal axis. The multiple holes of hole array 35*a* can be utilized in conjunction with various location settings in actuator mount parallel-arm lift arm assembly vertical beam side 33 and parallel arms 41 to create a wide variety of lifting geometries yielding multiple combinations of force, mechanical advantage, and vertical travel. As the mechanism raises the load, the geometry of the system causes upper parallel arm 41 to become proximate to lower parallel arm 41. As a safety measure to prevent overtravel, parallel arm limit switch 41*b* may be engaged to stop upward motion at a point determined by its positioning and size. It is important to point out that parallel arm lift assembly actuator 39 may consist of a number of popular drive mechanisms including, but not limited to, hydraulic, screw drive, pneumatic, rack and pinion, and other popular drive methods.

Continuing further rightward, parallel-arm lift arm assembly receiver pivoting head vertical axis 42 has a dual function of providing axle/pivot point holes to engage with parallel-arm lift arm assembly vertical beam adjustment holes 37 (see FIGS. 13-13*b*) of the upper and lower parallel arms 41, as well as providing a vertical pivotal joint designed to engage with a pin protruding downward from parallel-arm lift arm assembly receiver pivoting head horizontal axis 43 into parallel-arm lift arm assembly receiver pivoting head vertical axis 42, in such a manner as to provide free rotation of parallel-arm lift arm assembly receiver pivoting head horizontal axis 43 about a substantially vertical axis. Picking device support structure 44 incorporates a pin that is inserted into parallel-arm lift arm assembly receiver pivoting head horizontal axis 43 permitting free rotation about a substantially horizontal axis. Picking device support structure handles 45 allow for easy hold points when maneuvering loads with the system. Platform adapter picking device platform 46 is fixedly attached to the base of Picking device support structure 44 to facilitate lifting and loading of objects that require a flat surface. It should be noted that a critical advantage of the design of parallel-arm lift arm assembly 500 with fork adapter picking device and parallel-arm lift arm assembly 501 with platform adapter picking device is the interplay between parallel-arm lift arm assembly receiver pivoting head vertical axis 42, parallel-arm lift arm assembly receiver pivoting head horizontal axis 43, and the height of picking device support structure 44. Since the center of gravity tends to be substantially lower than parallel-arm lift arm assembly receiver pivoting head horizontal axis 43, platform adapter picking device platform 46 will tend to find its center of gravity in a horizontal position thus stabilizing any load being borne, while parallel-arm lift arm assembly receiver pivoting head vertical axis 42 allows for free rotation through a wide arc. This feature, in conjunction with the great positional flexibility of assembly 400 depicted in particular in FIG. 9, allows for an unparalleled three-dimensional movement flexibility. It should be noted that this apparatus 11 can be configured to incorporate assemblies 200, 201, 300, 301, 302, 303 and multiple configurations of assembly 400 and extensions 401, 402, and 403 and is subject to the general descriptions and discussions of assemblies 200, 300, and 400 above.

Figure 10:
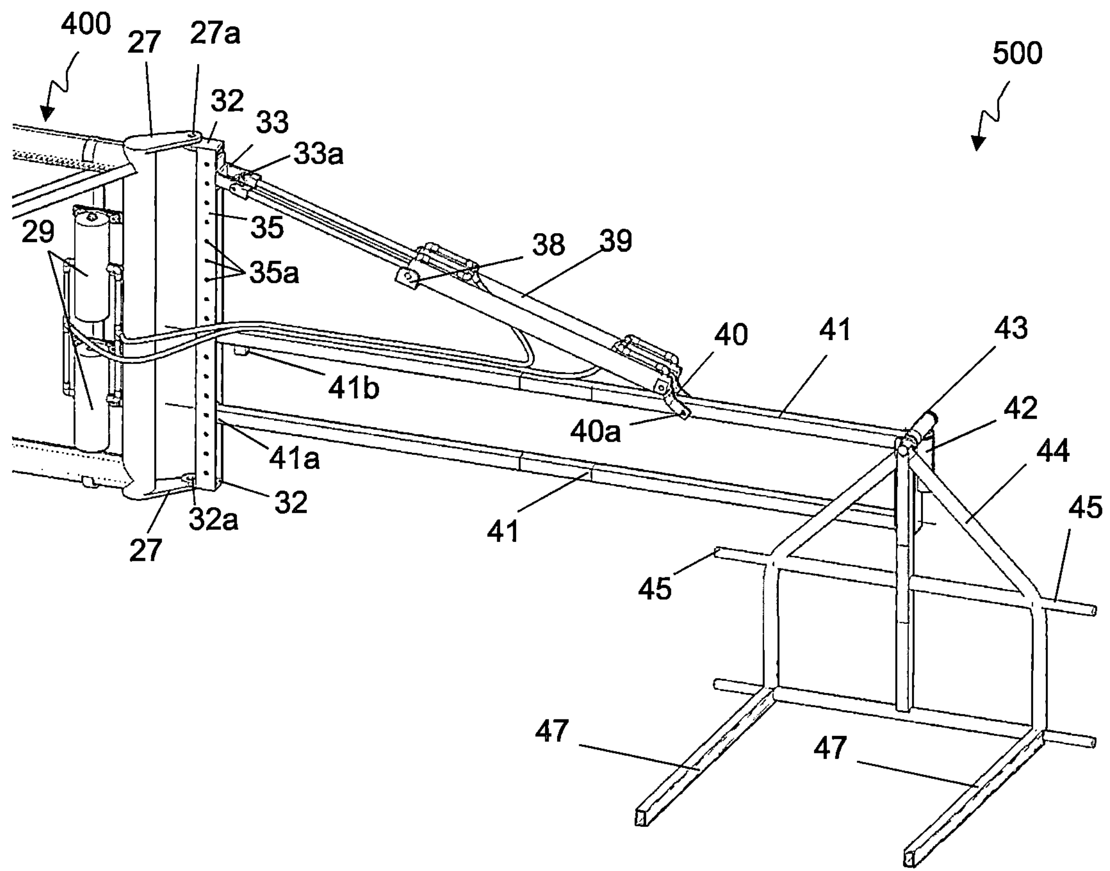
FIG. 10 shows an oblique view of a lift arm assembly with a fork adapter picking device option in accordance with an embodiment of the present disclosure.
Figure 11:
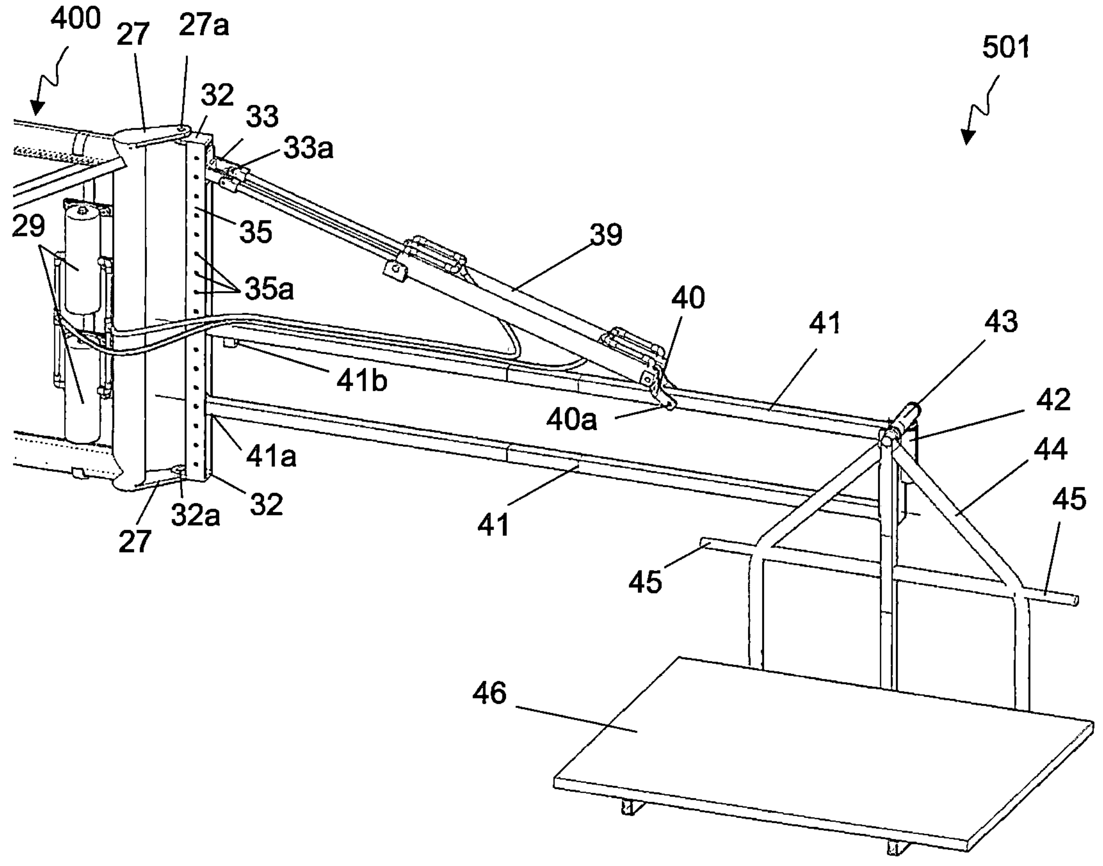
FIG. 11 shows an oblique view of a lift arm assembly with a platform adapter picking device option in accordance with an embodiment of the present disclosure.

Apparatus 10 discloses parallel-arm lift arm assembly 500 with fork adapter picking device as shown in FIGS. 1, 10, and 14. All aspects of the assembly function and can be enhanced with all assemblies as described and referenced above in connection with apparatus 10, with the exception that in lieu of platform adapter picking device platform 46 of assembly 501, and in its place are two fork adapter picking device forks 47, designed to facilitate lifting of objects that require a fork-style adapter, such as pallets or trays.

Figure 12:
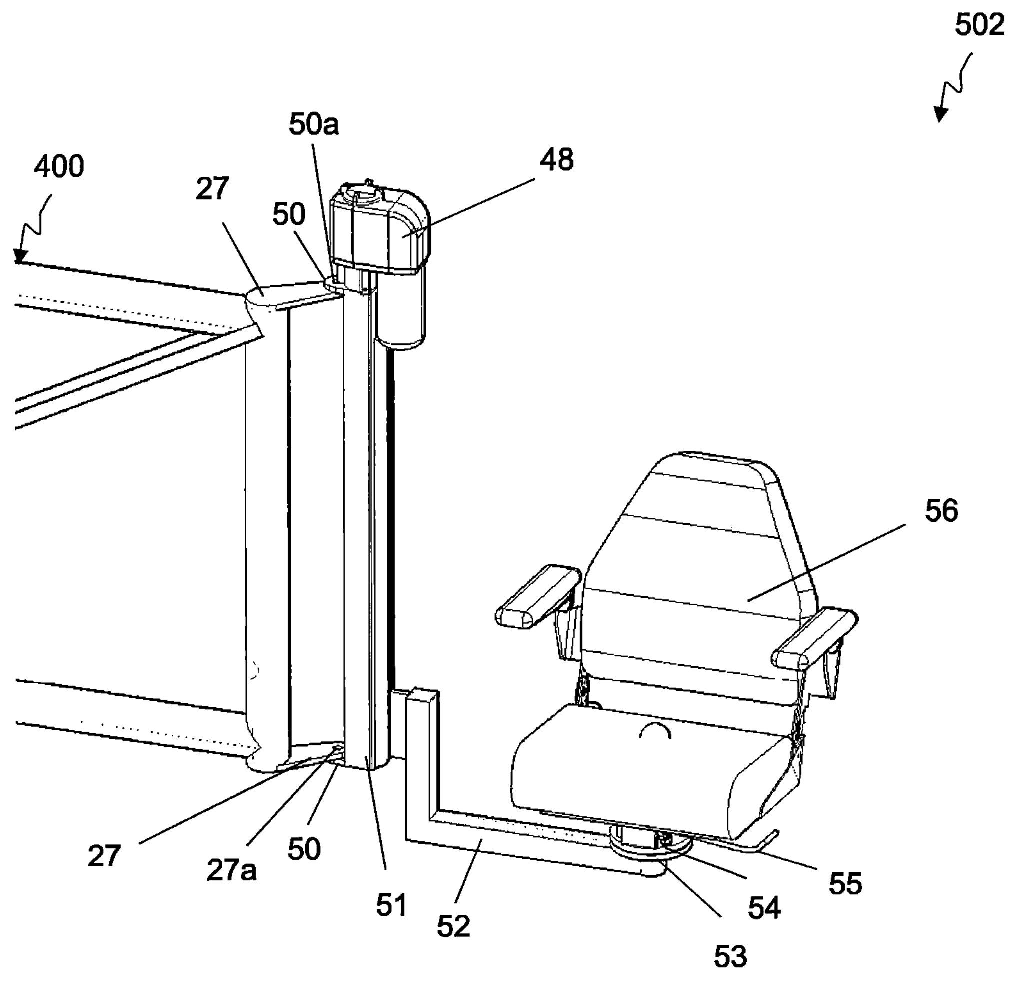
FIG. 12 shows an oblique view of a lift arm assembly with a seat adapter picking device option in accordance with an embodiment of the present disclosure.
Figure 13:
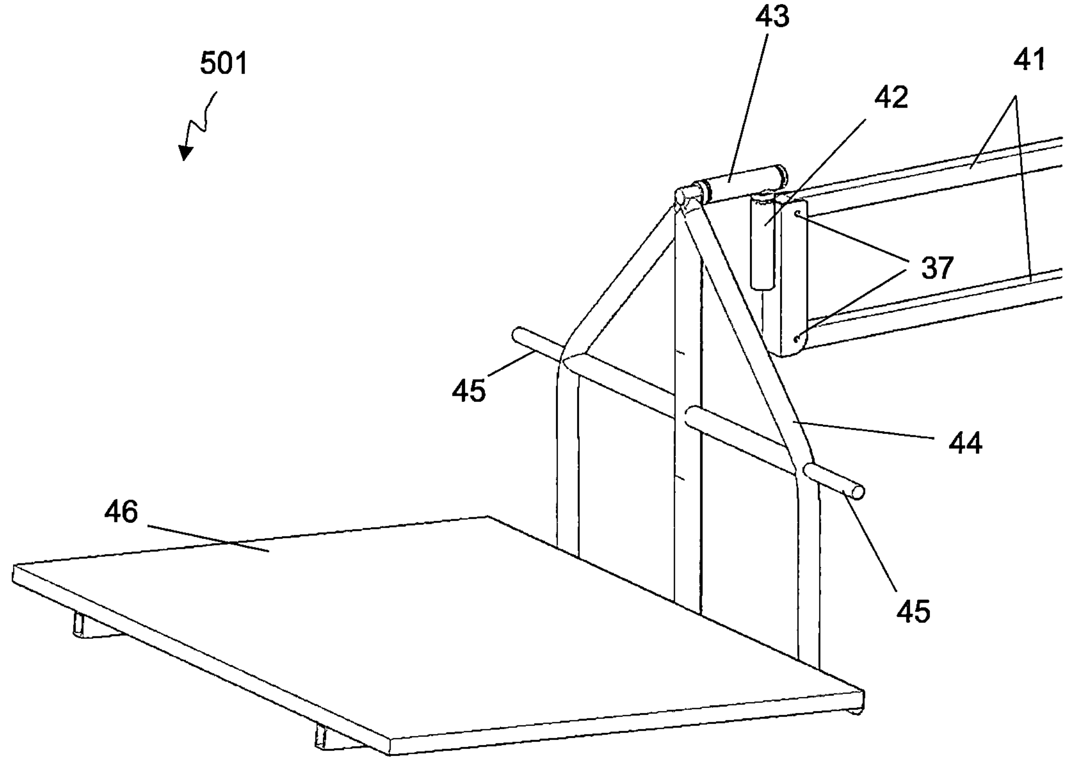
FIG. 13 is an oblique right rear view of a lifting and load transferring apparatus in accordance with an embodiment of the present disclosure with a platform/fork adapter option deployed, with a powered parallel-arm lift arm assembly in a horizontal position, with a view showing a side of a multi-axis pivot joint at a head of the powered parallel-arm lift assembly.
Figure 13A:
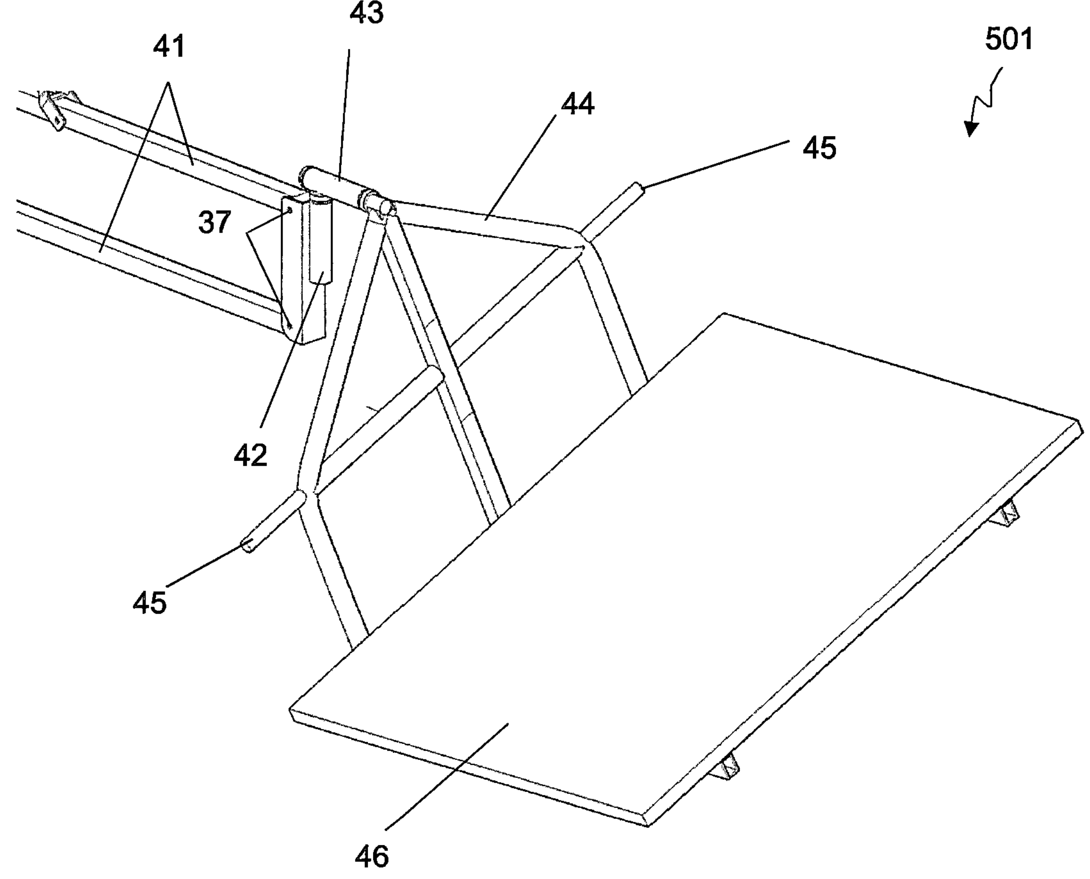
FIGS. 13*a* and 13*b* are oblique views of a lifting and load transferring apparatus in accordance with an embodiment of the present disclosure with a platform/fork adapter option deployed, with a powered parallel-arm lift arm assembly in a horizontal position, with a detail view demonstrating various rotational capabilities of a multi-axis pivot joint at a head of the powered parallel-arm lift assembly.
Figure 13B:
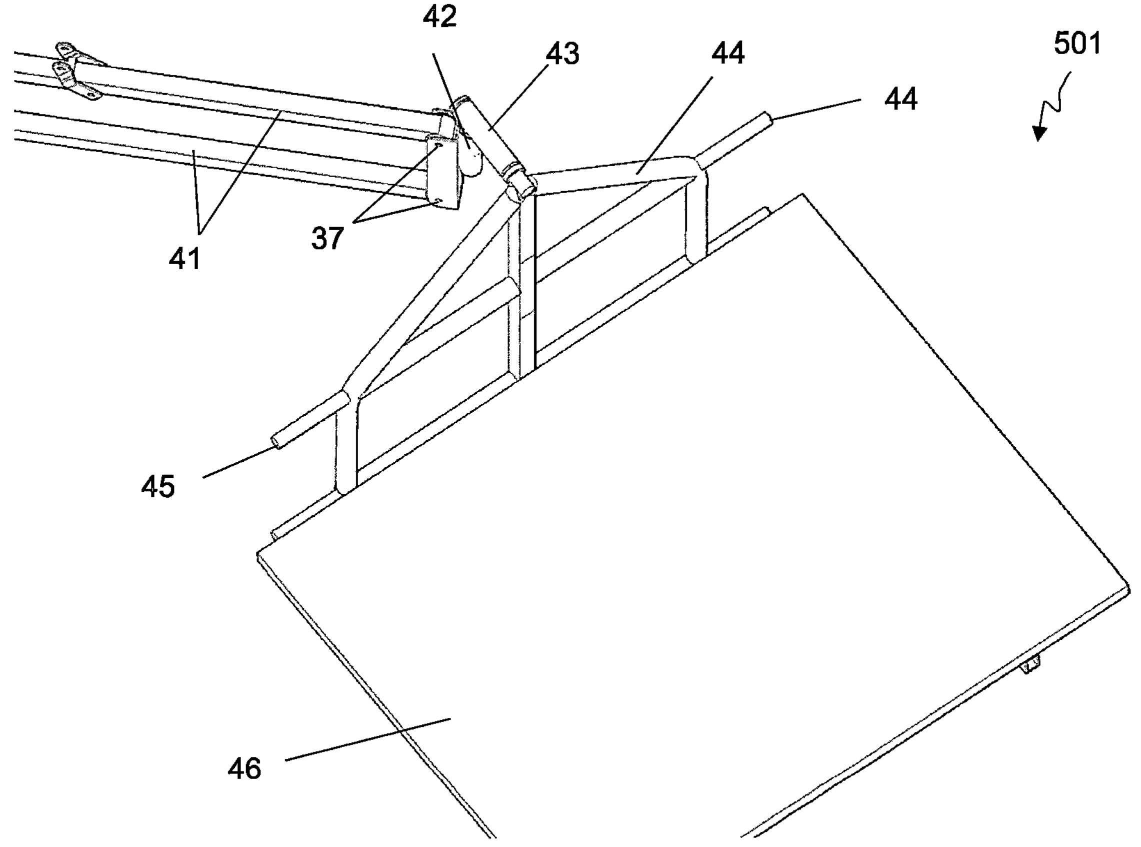

Apparatus 12 discloses parallel-arm lift arm assembly 502 with fork adapter picking device as shown in FIGS. 3 and 12. All aspects of the system function and can be enhanced with all systems as described and referenced above in connection with apparatus 10, with the exception that in lieu of assembly 501, assembly 502 is added to incorporate seated functionality, to transport humans. Thus, upper and lower seated lift assembly pivot tab 50 are fixedly attached at the top and bottom of seat lift vertical support beam/actuator 51 so as to be aligned with upper and lower extension hinge joint tab long 27 of the adjacent member of assembly 400 to facilitate connection via bolt or pin of seated lift pivot tab hole 50*a* to extension hinge joint tab long hole 27*a*, facilitating rotation about a substantially vertical axis of assembly 502. Vertical motion is achieved by a simple actuator mechanism which may consist of a number of popular drive mechanisms including, but not limited to, hydraulic, screw drive, pneumatic, rack and pinion, and other popular drive methods. Activation of seat lift vertical support beam/actuator 51 causes an up down movement of the assembly including seat lift seat horizontal support and pivot tray 52 and seat lift seat 56. Additional rotational flexibility in the positioning of the seat about a substantially vertical axis is provided by a combination of seat lift swivel flange assembly 53, seat lift locking pin 54, and seat lift locking pin handle 55.

FIG. 14 discloses system securement hook 58, whose purpose is to secure assembly 400 when stowed. It functions by engaging with either upper or lower parallel-arm lift arm assembly parallel arm 41 of assembly 500 or 501.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. An apparatus for lifting and transporting objects, the apparatus comprising:

a vertical support beam, the vertical support beam comprising at least one first attachment means for removably attaching to a base object, the vertical support beam comprising at least one second attachment means for removably rotatably attaching to a lifting apparatus for lifting objects; and a plurality of outriggers pivotably attached to a lower end of the vertical support beam, each outrigger comprising an arm extending away from the vertical support beam in a substantially horizontal position in a deployed state and pivoting to a substantially vertical position in a stowed state, each outrigger arm comprising third attachment means at a first end thereof for pivotably attaching the respective outrigger arm to the vertical support beam such that the respective outrigger arm may be locked in the substantially horizontal position in the deployed state and the substantially vertical position in the stowed state, wherein the third attachment means comprises adjustment means for adjusting the substantially horizontal position of the respective outrigger arm in the deployed state, at least one outrigger arm comprising support means at a second end thereof for supporting the vertical support beam in a substantially vertical orientation while in the deployed state, wherein the support means comprises a caster assembly including a castor mount that is rotatable around a substantially vertical axis, wherein the castor mount comprises a swivel means for maintaining a substantially vertical axis of rotation of the caster mount when adjusting the substantially horizontal position of the at least one outrigger arm in the deployed state via the adjustment means.

2. The apparatus of claim 1, further comprising an actuator pivotably attached to both the vertical support beam and at least one of the plurality of outrigger arms.

3. The apparatus of claim 1, wherein the at least one first attachment means comprises an interface tube for attaching to a mating member of the base object.

4. The apparatus of claim 3, wherein the mating member is a mating interface tube that mates with the interface tube of the at least one first attachment means.

5. The apparatus of claim 1, wherein the castor mount comprises a castor wheel that is rotatable around a substantially horizontal axis.

6. The apparatus of claim 1, wherein at least one outrigger arm is extendable in a telescoping manner inward to and outward from the vertical support beam.

7. An apparatus for lifting and transporting objects, the apparatus comprising:

a vertical support beam, the vertical support beam comprising at least one first attachment means for removably attaching to a base object, the vertical support beam comprising at least one second attachment means for removably rotatably attaching to a lifting apparatus for lifting objects; and a plurality of outriggers pivotably attached to a lower end of the vertical support beam, each outrigger comprising an arm extending away from the vertical support beam in a substantially horizontal position in a deployed state and pivoting to a substantially vertical position in a stowed state, each outrigger arm comprising third attachment means at a first end thereof for pivotably attaching the respective outrigger arm to the vertical support beam such that the respective outrigger arm may be locked in the substantially horizontal position in the deployed state and the substantially vertical position in the stowed state, wherein the third attachment means comprises adjustment means for adjusting the substantially horizontal position of the respective outrigger arm in the deployed state, at least one outrigger arm comprising support means at a second end thereof for supporting the vertical support beam in a substantially vertical orientation while in the deployed state, wherein the support means comprises a pad assembly including a pad mount that is rotatable around a substantially vertical axis, wherein the pad mount comprises a swivel means for maintaining a substantially vertical axis of rotation of the pad mount when adjusting the substantially horizontal position of the at least one outrigger arm in the deployed state via the adjustment means.

8. The apparatus of claim 7, wherein the pad mount comprises a pivotable pad that is pivotable around a substantially horizontal axis.

9. The apparatus of claim 7, further comprising an actuator pivotably attached to both the vertical support beam and at least one of the plurality of outrigger arms.

10. The apparatus of claim 7, wherein the at least one first attachment means comprises an interface tube for attaching to a mating member of the base object.

11. The apparatus of claim 10, wherein the mating member is a mating interface tube that mates with the interface tube of the at least one first attachment means.

12. The apparatus of claim 7, wherein at least one outrigger arm is extendable in a telescoping manner inward to and outward from the vertical support beam.

* * * * *